(12) United States Patent
Wang et al.

(10) Patent No.: US 8,316,432 B2
(45) Date of Patent: Nov. 20, 2012

(54) METHOD FOR IMPLEMENTING SECURITY-RELATED PROCESSING ON PACKET AND NETWORK SECURITY DEVICE

(75) Inventors: Ju Wang, Beijing (CN); Mingyu Li, Beijing (CN); Xudong Zou, Beijing (CN); Xiangqing Chang, Beijing (CN); Zhongwei Fang, Beijing (CN); Xiao Li, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 395 days.

(21) Appl. No.: 12/529,907

(22) PCT Filed: Jul. 17, 2008

(86) PCT No.: PCT/CN2008/071676
§ 371 (c)(1),
(2), (4) Date: Sep. 3, 2009

(87) PCT Pub. No.: WO2009/015578
PCT Pub. Date: Feb. 5, 2009

(65) Prior Publication Data
US 2010/0132028 A1 May 27, 2010

(30) Foreign Application Priority Data

Aug. 2, 2007 (CN) .......................... 2007 1 0119879
Aug. 2, 2007 (CN) .......................... 2007 1 0119880
Aug. 2, 2007 (CN) .......................... 2007 1 0119881

(51) Int. Cl.
*H04L 29/06* (2006.01)
(52) U.S. Cl. ................. 726/13; 726/12; 726/14
(58) Field of Classification Search ............ 726/11, 726/12, 13, 14; 713/160, 161, 154, 153; 709/238–244
See application file for complete search history.

(56) References Cited

U.S. PATENT DOCUMENTS 7,913,294 B1 * 3/2011 Maufer et al. ............. 726/3
2007/0121655 A1 5/2007 Jin

FOREIGN PATENT DOCUMENTS

| CN | 1464703 A | 12/2003 |
| CN | 1777174 A | 5/2006 |
| CN | 1794695 A | 6/2006 |
| CN | 1845531 A | 10/2006 |
| CN | 1863158 A | 11/2006 |
| CN | 1913495 A | 2/2007 |
| CN | 1996948 A | 7/2007 |
| CN | 101106529 A | 1/2008 |
| CN | 101110769 A | 1/2008 |
| CN | 101110770 A | 1/2008 |
| WO | WO-2007/009349 A1 | 1/2007 |

* cited by examiner

*Primary Examiner* — Edward Zee
(74) *Attorney, Agent, or Firm* — Marshall, Gerstein & Borun LLP

(57) ABSTRACT

Embodiments of the present invention provide method for implementing security-related processing on packet and a network security device. Through establishing a relationship between stream attribute information of an initial packet of a stream and security-related processing information implemented on the initial packet, when a succeeding packet of the stream is received, the previously stored relationship is acquired according to stream attribute information of the succeeding packet, the security-related processing is implemented on the succeeding packet according to the security-related processing information in the relationship. Therefore, according to the method for implementing security-related processing on packet and the network security device provided by the present invention, the process of searching for security information entries for succeeding packets of a stream is not required, the security-related processing procedure of the packet is thus accelerated, and the packet processing efficiency is improved.

24 Claims, 13 Drawing Sheets

METHOD FOR IMPLEMENTING SECURITY-RELATED PROCESSING ON PACKET AND NETWORK SECURITY DEVICE

FIELD OF THE INVENTION

The present invention relates to security-related service technologies, and particularly, to method for implementing security-related processing on packet and network security device.

BACKGROUND OF THE INVENTION

As network technologies are developing and widely applied, network devices are not only required to perform rapid message forwarding, but also required to provide security-related services. Demands of the market encourages development of network security devices which are required to provide relatively good performance when implementing security-related processing on network data, such as security inspection and filtering, and so on.

To satisfy the above requirements, improved hardware performance and optimized service processing procedure of network security devices are key factors.

In the prior art, after receiving a packet, a network security device firstly searches security information entries in security-related configuration information one by one for one or more security information entries which match the 5-tuple information of the packet. Each time when finding a matching security information entry, the network security device performs security-related processing on the packet according to the security information entry. Security information entries are generally stored in multiple tables. Each table entry (or item) defines a type of security-related processing to be implemented on packets satisfying a certain condition, and each of those limitations is generally set for a specified stream (also called a session or a service). After implementing all matching security-related processing on the packet, the network security device then searches for packet forwarding information, and forwards the packet.

It can be seen that according to the prior art, the packet processing procedure is relatively long and the processing efficiency is relatively low. How to improve the packet processing performance of a network security device becomes a problem that security products need to deal with.

SUMMARY OF THE INVENTION

To sum up, the present invention provides a method for implementing security-related processing on packet and a network security device, so as to improve the efficiency of the security-related processing of packets.

In an embodiment of the present invention, when the first packet (also called an initial packet) of a stream is received, security-related processing is implemented on the first packet by using the prior art. But different from the prior art, information of all security-related processing implemented on the first packet is recorded during the security-related processing, and a relationship between stream attribute information carried in the first packet and the security-related processing information recorded is established and stored. When a succeeding packet of the stream is received, since the succeeding packet carries the same stream attribute information as the first packet, the relationship stored previously may be obtained and security-related processing can be implemented on the succeeding packet according to the security-related processing information stored in the relationship. Therefore, for succeeding packets of the stream, the method of the present invention for implementing security-related processing on packet does not need to search the entries in the security-related configuration information one by one for matching security information entries, thus the security-related processing procedure for packets is simplified, and packet processing efficiency is increased.

In order to further simplify the packet forwarding flow, in an embodiment of the present invention, information related to forwarding the first packet is added into the above described relationship; when a succeeding packet of the stream is received, packet forwarding information can be acquired according to the information related to forwarding in the relationship and then the succeeding packet can be forwarded according to the packet forwarding information. Therefore, the packet processing procedure is further simplified, and the packet processing efficiency is increased.

Since the security-related processing information is directly acquired from the relationship, when security-related configuration information in the network security device is altered, the security-related processing information in the relationship also needs to be updated. In an embodiment of the present invention, an abstract of the security-related configuration information is calculated and stored in the relationship. Each time the relationship is accessed, the abstract in the relationship is compared with the latest abstract of the current security-related configuration information stored in the network security device. Therefore, it can be determined that whether the security-related configuration information in the network security device has been altered. If the security-related configuration information has been altered, a process for updating the relationship will be triggered.

In an embodiment in which the packet forwarding information is also stored in the relationship, because the packet forwarding information of the succeeding packet is also directly acquired from the relationship, when some information related to packet forwarding (such as a FIB entry, an ARP entry etc.) in the network security device is altered, the packet forwarding information of the succeeding packet also needs to be updated. Embodiments of the present invention also provide several processes for updating the packet forwarding information in the relationship when information related to packet forwarding is altered.

When a FIB entry in the network security device is altered, the possible change in egress interface may result in a change of out-domain security-related processing to be implemented on succeeding packets. Embodiments of the present invention provide a process for updating the security-related processing information in the relationship when an FIB entry is altered.

Through the above updating processes of the relationship, the method for implementing security-related processing on packet of the present invention is more reliable and efficient.

Since the network security device stores a relationship for each of the streams, with streams being generated and ended, maintenance of the relationships is also important. An embodiment of the present invention provides a process for deleting a relationship that is not accessed for a period of time, so resources of the network security device is utilized more efficiently.

DETAILED DESCRIPTION OF THE INVENTION

Figure 1:
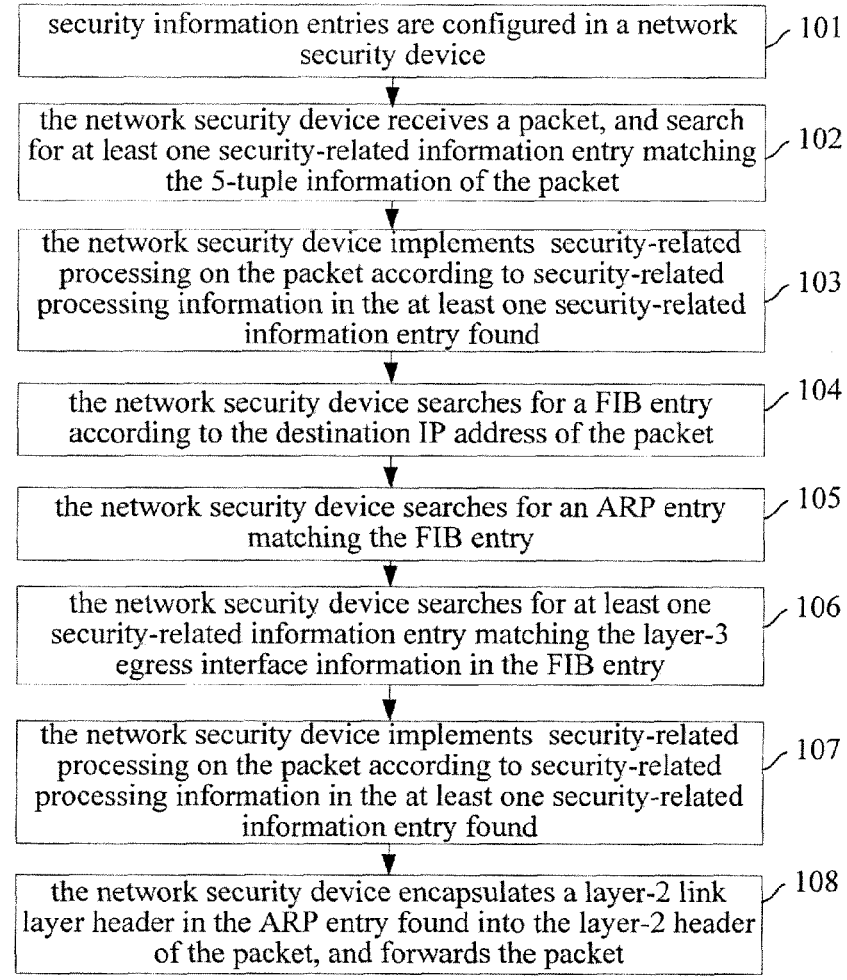
FIG. 1 is a flow chart illustrating a typical packet forwarding process in a network security service.

When receiving a packet, a network security device typically searches security-related configuration information for a security information entry that matches information carried in the packet, and implements security-related processing on the packet according to the security information entry. Then the network security device searches for another matching security information entry until security-related processing in all matching security information entries are implemented. Finally, the packet is forwarded by the network security device. FIG. 1 is a flow chart illustrating a typical packet security-related processing and forwarding process, which may include steps as follows.

In step 101, security-related configuration information is configured in a network security device, which may include a plurality of security service items (or security information entries). Each security information entry indicates a type of security-related processing to be implemented on a packet satisfying a condition specified in the entry.

The security-related configuration information is usually distributively stored in several security-related processing units in the network security device. The security-related processing units are adapted to implement different types of security-related processing and store respective security information entries. When a packet is transferred among the different security-related processing units, the different security-related processing units implement respective types of security-related processing on the packet respectively. Each security information entry may include: a relationship between a certain type of security-related processing and any or any combination of attribute information (e.g. the 5-tuple information) carried in the packet.

The 5-tuple information includes: source IP address information, source port information, protocol number, destination IP address information and destination port information.

Forwarding information includes Media Access Control (MAC) information, egress interface information for forwarding the packet etc., such as layer-three egress interface information in a Forwarding Information Base (FIB) item (or entry), or egress port information or MAC address in an Address Resolution Protocol (ARP) entry, and etc.

A security-related processing indicates a processing to be implemented on a packet, such as filtering processing and etc.

For example, a security information entry may specify: block a packet whose source IP address is 202.38.0.0 0.0.255.255, destination IP address is 202.38.160.0 0.0.0.255, and destination port is larger than 128 etc. In addition, also established may be a relationship between forwarding information and the security-related processing information, or a relationship between the forwarding information, the security-related processing information and any or any combination of the 5-tuple information, or a relationship between the forwarding information, the security-related processing information, any or any combination of the 5-tuple information, and other information. Different security-related configuration information may also be configured for each ingress interface, for each egress interface, for a set of several ingress interfaces (in-domain), or for a set of several egress interfaces (out-domain) respectively.

In step 102, the network security device receives a packet, and searches for at least one security information entry matching the 5-tuple information of the packet. In this step, several types of security-related processing may be implemented on the packet, and different types of security-related processing may be implemented by different processing units. The network security device (or each security-related processing unit in the network security device) has to search in the security information entries of the security-related configuration information one by one and determine whether the packet satisfies a condition specified in each security information entry. If the packet satisfies the condition in a security information entry, it means that the packet matches the security information entry.

In step 103, the network security device implements security-related processing on the packet according to the security-related processing information in the at least one security information entry found. After the processing is completed, step 104 is performed. In this step, the attribute information carried in the packet should be compared with each of the configured security information entries one by one until all matching security information entries are found.

The security-related processing in this step includes security-related processing for in-domain of the network security device.

In step 104, the network security device searches for a FIB entry according to the destination IP address of the packet.

In step 105, the network security device searches for an ARP entry which best matches the FIB entry.

In step 106, the network security device searches for at least one security information entry matching layer-3 egress interface information in the FIB entry.

In step 107, the network security device implements security-related processing on the packet according to security-related processing information in the at least one security information entry found. After the processing is completed, step 108 is performed.

The security-related processing in the step includes security-related processing for the out-domain of the network security device.

In step 108, the network security device encapsulates a layer-2 link layer header in the ARP entry found into the layer-2 header of the packet, and then forwards the packet.

From the process of FIG. 1 it can be seen that: after receiving the packet, the network security device firstly searches for one or more security information entry that match the 5-tuple information of the packet, implements corresponding security-related processing. Then the network security device searches for a FIB entry and an ARP entry, searches for one or more security information entry based on the FIB entry and the ARP entry found, implements corresponding security-related processing and finally forwards the packet according to the ARP entry.

From the above description one can see that: large amount of operations need to be performed on each packet for determining whether a security information entry a matching one; and during the process of searching and processing packet forwarding information, matching security information entries are also searched for to implement security-related processing, which includes too many searching processes and packet processing processes, and the processing procedure is relatively long.

In order to improve the packet processing performance of the network security device, the searching and matching process of the security information entry should be simplified. Since stream attribute information carried in each packet of a stream (also called an end-to-end service or session), such as the 5-tuple information, is the same, the stream attribute information can be used for uniquely identifying a stream. Furthermore, security information entries are usually established based on stream attribute information, i.e. security-related processing implemented on each packet of the same stream are the same. Therefore, a process in accordance with an embodiment of the present invention mainly includes: implementing security-related processing on an initial packet of a stream according to the prior art, and at the same time recording information about all security-related processing implemented on the initial packet, and a relationship between the stream attribute information and the security-related processing information recorded is established. When a succeeding packet of the stream is received, information of security-related processing is directly acquired by searching for the relationship utilizing the stream attribute information carried in the succeeding packet. And then the security-related processing is implemented on the succeeding packet according to the security-related processing information stored in the relationship, without having to search in security information entries one by one.

Therefore, the main process of the embodiment may include: receiving an initial packet of a stream, implementing security-related processing on the initial packet according to security-related configuration information, recording security-related processing information about the security-related processing implemented on the initial packet, establishing a relationship between stream attribute information carried in the initial packet and the security-related processing information recorded; receiving a succeeding packet of the stream, acquiring the security-related information in the relationship based on stream attribute information carried in the succeeding packet, and implementing security-related processing on the succeeding packet.

Since each packet of a stream (also called an end-to-end service or session) generally has the same forwarding route, each packet of the same stream should have the same packet forwarding information. For this reason, in an embodiment of the present invention, a relationship between stream attribute information and packet forwarding information may also be established. For example, information related to packet forwarding (e.g. an egress interface, MAC information, FIB entry information or ARP entry information) may be added in the foregoing established relationship. When a succeeding packet of the stream is received, packet forwarding information can be directly acquired by utilizing the information related to packet forwarding (referred to as forwarding-related information for short) in the relationship, and then the succeeding packet can be forwarded according to the packet forwarding information acquired, through which the process of searching for packet forwarding information is simplified.

In addition, since relationships are established between the stream attribute information and the security-related processing information and between the stream attribute information and the packet forwarding-related information, the process of searching for information is not needed for succeeding packets. However, if configurations of security information entries or for packet forwarding-related information are altered after the relationships are established, the information stored in the relationships should also be updated. Several methods for updating the information in the relationships are provided by embodiments of the present invention. So when the configurations for the security information entries or for the FIB entries are altered, information in affected relationships is also updated. Those methods will be described in detail in the following embodiments.

The above described the establishing and updating of relationships. When a stream ends, the relationships should also be deleted from the network security device. If not, the number of relationships for streams will continuously increase, which will result in more and more storage resources occupied. For this reason, the present invention also provides an aging mechanism for the relationships established, according to which relationships that are not accessed over a period of time will be deleted from the device, thus normal operation of the device is guaranteed.

Figure 2:
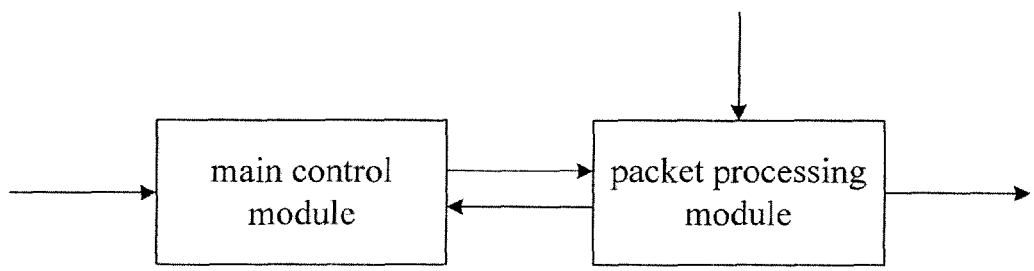
FIG. 2 is a schematic illustrating a structure of a network security device.

In order to implement the above method, the present invention also provides a network security device. Several embodiments of the network security device will be described in detail as follows. FIG. 2 is a schematic diagram illustrating a structure of a network security device in accordance with an embodiment of the present invention. As shown in FIG. 2, the network security device includes a main control module and a packet processing module. The main control module is adapted to establish, store, and update a security information entry, a FIB entry, an ARP entry etc., search for security-related processing information or packet forwarding information in response to a request from the packet processing module, and send information found to the packet processing module. The main control module is generally implemented by software means which refers to a processing entity comprising a central processing unit (CPU) and programs. The processing of the main control module is relatively flexible but is relatively low. The packet processing module is adapted to implement security-related processing on a received packet according to the security-related processing information and forwarding information sent by the main control module, and forward the packet. The packet processing module may be implemented by software means or by hardware means. The hardware means refers to a logic processing entity comprising logic parts, such as Field Programmable Gate Array (FPGA) or Ternary Content Addressable Memory (TCAM), which features in high processing rate but is relatively inflexible. The relationship between stream attribute information and security-related processing information may be established in the main control module or in the packet processing module.

The method and device provided by the present invention will be described in detail with reference to the following embodiments.

Embodiment One

The method for performing security-related processing on packet in accordance with the present embodiment includes steps as follows.

A network security device receives an initial packet of a stream, searches for at least one security information entry applicable to the stream according to stream attribute information carried in the initial packet, implements security-related processing on the initial packet, records information about the security-related processing implemented on the initial packet, and establishes a relationship between the stream attribute information of the initial packet and the recorded information about the security-related processing. The recorded information about the security-related processing may include an identifier (and a parameter, if there is the parameter) of the security-related processing implemented, or the contents of the security information entry. The network security device searches for a FIB entry according to the stream attribute information, searches for an ARP entry based on the FIB entry found, and forwards the initial packet according to the ARP entry.

When a succeeding packet is received, the relationship is obtained according to the stream attribute information carried in the succeeding packet, and security-related processing is implemented on the succeeding packet according to the information about the security-related processing in the relationship. The FIB entry is found according to the stream attribute information, the ARP entry is found based on the FIB entry, and the succeeding packet is forwarded according to the ARP entry.

From the above description, it can be seen that since the relationship between the stream attribute information of the stream and the information about the security-related processing is established when the initial packet of the stream is received, when the succeeding packet of the stream is received, information about all the security-related processing to be implemented can be acquired without searching for matching security information entries one by one according to the stream attribute information, the security-related processing is accelerated and the processing efficiency is raised.

In the above process, the relationship between the stream attribute information and the information about security-related processing may be established by utilizing the following method. Establish a stream table (herein also called a session table) and establish a session entry in the session table. The session entry includes stream attribute information and information about security-related processing.

In order to raise efficiency of the packet forwarding, the network security device may establish a relationship between a FIB entry and corresponding ARP entry. When the FIB entry is found, the ARP entry can be directly acquired, so the step of searching for the ARP entry is no longer needed and the searching efficiency is increased.

The present embodiment will be described in detail with reference to the drawings.

Figure 3:
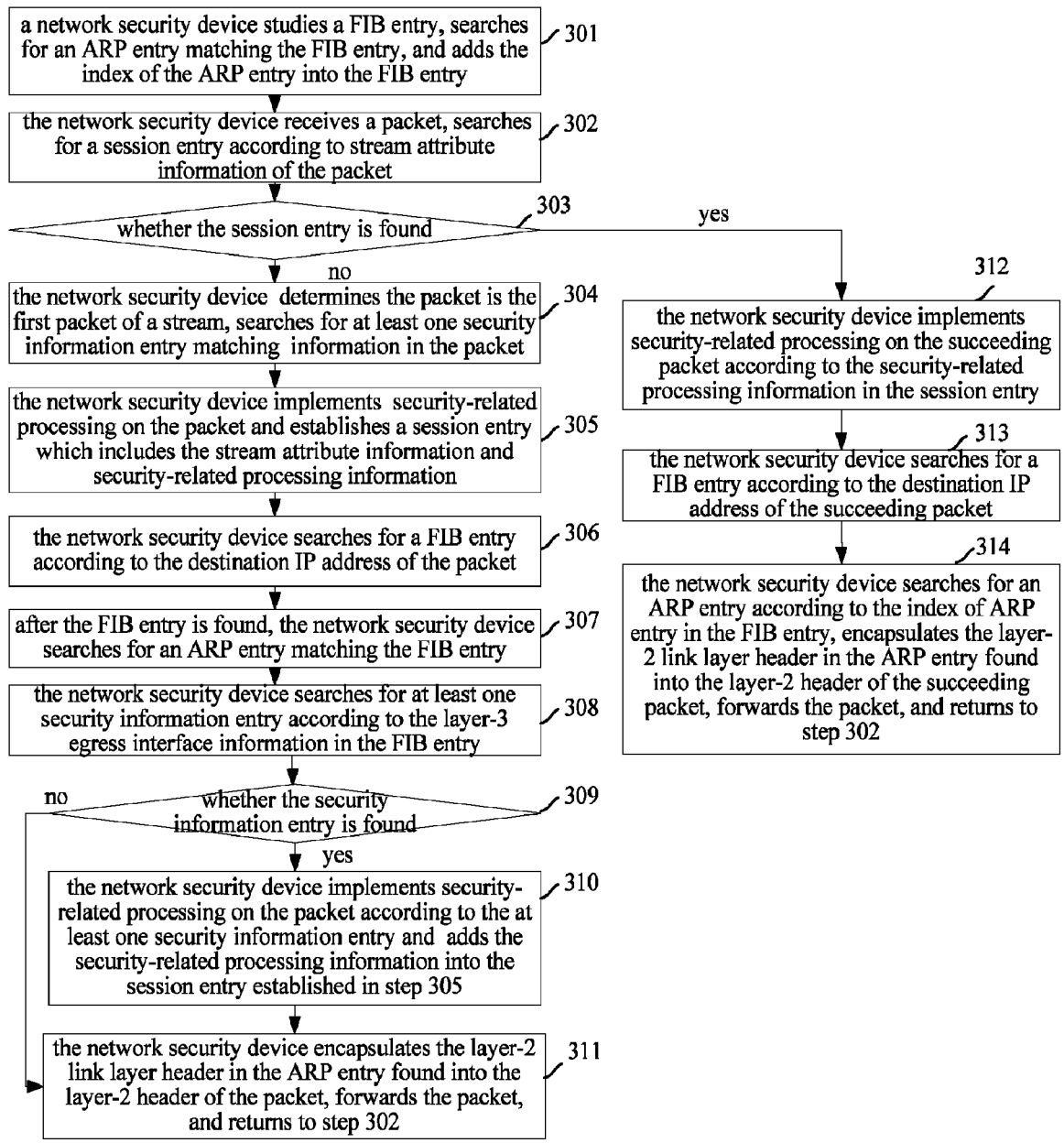
FIG. 3 is a flow chart illustrating a method for implementing security-related processing on packet in accordance with Embodiment one of the present invention.

FIG. 3 is a flow chart illustrating a method for implementing security-related processing on packet in accordance with embodiment one of the present invention.

In step 301, a network security device studies a FIB entry, searches for an ARP entry matching the FIB entry, and adds the index of the ARP entry into the FIB entry.

Herein, the studying process includes acquiring the contents of the FIB entry through a process specified in an existing protocol. The contents of the FIB entry may include destination IP address information+destination mask information+layer-3 egress interface information+next hop information+an index of an ARP entry.

When the FIB entry is updated, since the change in the contents of the FIB entry may result in the matching between the updated FIB entry and another ARP entry, thus the ARP entry which best matches the updated FIB entry should be found and the index of the newly found ARP entry should substitute the index of the former ARP entry in the FIB entry.

In step 302, the network security device receives a packet and searches for a session entry according to stream attribute information of the packet, such as the 5-tuple information.

In step 303, the main control module determines whether the session entry is found. If the session entry is found, step 312 will be performed, otherwise, step 304 will be performed.

In step 304, the main control module determines that the packet is an initial packet of a stream and searches for at least one security information entry applicable to the stream attribute information carried in the initial packet.

In step 305, the network security device implements security-related processing on the initial packet based on the at least one security information entry found and establishes a new session entry. The new session entry may include the stream attribute information of the initial packet and information about the security-related processing implemented.

The network security device may find multiple security information entries that match the stream attribute information, and may implement multiple security-related processing, in which case the network security device may add information about all the security-related processing implemented into the newly established session entry.

In step 306, the network security device searches for a FIB entry according to the destination IP address of the initial packet.

The FIB entry may include destination IP address information, destination mask information, layer-3 egress interface information, next hop information and etc.

In step 307, after the FIB entry is found, the network security device searches for an ARP entry matching the FIB entry best.

Since the relationship between the FIB entry and the index of the ARP matching the FIB entry best has been established in step 301, in this step, the ARP entry matching the FIB entry best can be acquired according to the index of ARP entry in the FIB entry, which can remarkably increase the efficiency.

In step 308, the network security device searches for at least one security information entry according to the layer-3 egress interface information in the FIB entry.

In step 309, the network security device determines whether the security information entry is found. If the security information entry is found, step 310 will be performed, otherwise, step 311 will be performed.

In step 310, the network security device adds the security-related processing information in the at least one security information entry into the session entry established in step 305, and implements security-related processing on the initial packet according to the at least one security information entry, and performs step 311.

The security-related processing in this step includes security-related processing for the out-domain of the network security device. If no security information entry is found in step 309, it means that no security-related processing is needed for the out-domain of the network security device.

In step 311, the network security device encapsulates a layer-2 link layer header in the ARP entry found into the layer-2 header of the packet, forwards the packet, and returns to step 302.

In step 312, the network security device determines that the packet is a succeeding packet of the stream, implements security-related processing on the succeeding packet according to the security-related processing information in the session entry. After the processing is completed, step 313 will be performed.

In step 313, the network security device searches for a FIB entry according to the destination IP address of the succeeding packet.

In step 314, the network security device searches for an ARP entry according to the index of ARP entry in the FIB entry, encapsulates a layer-2 link layer header in the ARP entry found into the layer-2 header of the succeeding packet, forwards the packet, and returns to step 302.

From the process shown in FIG. 3, it can be seen that after studied the FIB entry, the network security device finds an ARP entry matching the FIB entry, and adds the index of the ARP entry into the FIB entry. Therefore, the efficiency of searching for ARP entry is increased.

After searching for security information entry and performing security-related processing on an initial packet of a stream, the session entry established by the network security device may include the 5-tuple information and the security-related processing information. The security-related processing information may be an identifier of the security-related processing (and a parameter, if there is the parameter), or an identifier of the security information entry, the contents of the security information entry and etc.

When a succeeding packet of the stream is received, the session entry is acquired according to the 5-tuple information of the succeeding packet. Security-related processing is implemented on the succeeding packet according to the information about security-related processing in the session entry. A FIB entry is then found based on the destination IP address of the succeeding packet, an ARP entry is acquired according to the index of ARP entry in the FIB entry, and then the succeeding packet is forwarded. It can be seen that information about all the security-related processing to be implemented is stored together in the session entry, so the security-related processing efficiency is increased. The session entry may also store only the information about security-related processing for in-domain or out-domain; however, storing information about all the security-related processing together in the session entry may achieve higher efficiency. When searching for the ARP entry, the matching process for ARP entry and FIB entry is not needed and the ARP entry may be directly acquired according to the index of ARP entry in the FIB entry, so the efficiency of packet forwarding can be raised.

During processing each packet of a stream, configurations for security information entries or the forwarding information may be altered. When the configurations are changed, if the information in the session entry is not updated accordingly, erroneous processing may be implemented on succeeding packets. In order to implement security-related processing on succeeding packets according to the updated security information entries after the security information entries are changed, the following method may be employed.

The change of security-related processing implemented on packets of the stream may result from two reasons: change of security-related configuration information in the network security device; change of egress interface for packet forwarding.

For the first situation, an abstract of current security-related configuration information may be stored in the network security device, and when the security-related configuration information is changed, the abstract is updated. When establishing a session entry, the abstract of the current security-related configuration information is stored in the session entry. When a succeeding packet is received, before acquiring information for implementing security-related processing, the network security device firstly judges whether the abstract stored in the session entry is the same with the abstract of the current security information entry stored in the network security device. If the two abstracts are the same, it indicates that the security-related configuration information has not been updated and the security-related processing is implemented. If the two abstracts are different, it indicates that the security-related configuration information has been updated and the process of security-related processing for the initial packet is implemented on the current succeeding packet, during which information nation about all the security-related processing implemented is record, and the information about security-related processing stored in the session entry is replaced with the newly recorded information about security-related processing. Therefore, it ensures that when the security-related configuration information is changed in the network security device, security-related processing may be implemented on succeeding packets according to the updated information.

In the second situation, egress interface is changed due to a change in FIB entry learned by the network security device, and different egress interfaces generally call for different security-related processing, so the second situation may be handled utilizing the following approaches. A relationship between the FIB entry and the session entry is established, when the FIB entry is updated, the information about security-related processing in the session entry is directly updated or a value stored in the session entry is changed. When accessing the session entry in which the value is stored, the network security device may determine whether the FIB entry has been updated according to the change of the value, and starts an updating process of security-related processing for the succeeding packet, i.e., searching for security information entry and processing the succeeding packet in the same way as for the initial packet, and records information about the security-related processing implemented. For example, a flag may be set in the session entry, the default value of the value indicates "valid" when establishing the relationship between the FIB entry matching the stream attribute information and the session entry of the stream. When the FIB entry is updated, the value of the flag in each session entries having a relationship with the FIB entry is changed to indicate "invalid". When a succeeding packet is received, if the value of the flag in the session entry indicates "invalid", the searching and security-related processing process will be implemented for the succeeding packet, which may include searching in security-related configuration information of the out-domain according to the layer-3 egress interface information in the FIB entry found and updating the information about security-related processing stored in the session entry using the newly recorded information about security-related processing.

Figure 4:
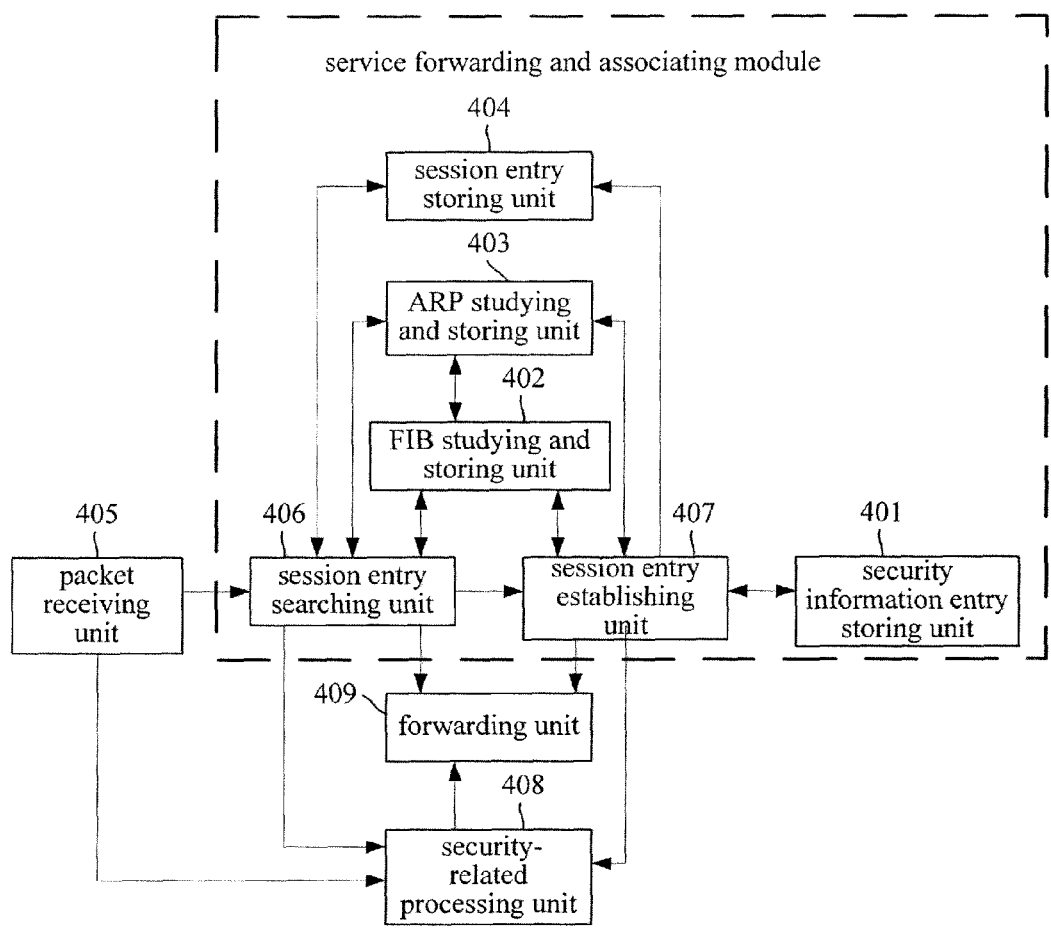
FIG. 4 is a schematic illustrating a structure of a network security device in accordance with Embodiment one of the present invention.

FIG. 4 is a schematic illustrating a structure of a network security device in accordance with embodiment one of the present invention. As shown in FIG. 4, the device mainly includes: a security information entry storing unit 401, a FIB studying and storing unit 402, an ARP studying and storing unit 403, a session entry storing unit 404, a packet receiving unit 405, a session entry searching unit 406, a session entry establishing unit 407, a security-related processing unit 408 and a forwarding unit 409.

The security information entry storing unit 401 is adapted to store security information entries, each of which includes 5-tuple information and/or forwarding information, and security-related processing information. If the network security device adopts different security-related processing units for implementing different security-related processing on packet, the security information entry storing unit 401 may be embodied by multiple security-related processing units. In the present embodiment, all entities for storing the security information entry are collectively referred to as the security information entry storing unit 401, and all entities for implementing security-related processing are collectively referred to as the security-related processing unit 408 for facilitating description. The security information entry storing unit 401 generally resides in the main control module shown in FIG. 2. The security-related processing unit 408 can be implemented by either the main control module or the packet processing module shown in FIG. 2.

The FIB studying and storing unit 402 is adapted to study and store a FIB entry, and search the ARP studying and storing unit 403 for an ARP entry which matches the FIB entry, and add the index of the ARP entry into the FIB entry. The FIB studying and storing unit 402 is generally implemented by the main control module shown in FIG. 2.

The ARP studying and storing unit 403 is adapted to study and store an ARP entry. The ARP studying and storing unit 403 is generally implemented by the main control module shown in FIG. 2.

The session entry storing unit 404 is adapted to store session entries, each of which includes stream attribute information (e.g. the 5-tuple information) and security-related processing information. The session entry storing unit 404 can be implemented by either the main control module or the packet processing module shown in FIG. 2.

The packet receiving unit 405 is adapted to receive a packet, and send the packet to the security-related processing unit 408 and the session entry searching unit 406. The packet receiving unit 405 is implemented by the packet processing module shown in FIG. 2.

The session entry searching unit 406 is adapted to receive the packet from the packet receiving unit 405, search the session entry storing unit 404 for a session entry according to the 5-tuple information of the packet. If the session entry is found, the session entry searching unit 406 is adapted to send information of at least one security information entry in the session entry to the security-related processing unit 408, and search the FIB studying and storing unit 402 for a FIB entry according to the destination IP address of the packet, search the ARP studying and storing unit 403 for an ARP entry according to an index of ARP entry in the FIB entry, and send the ARP entry to the forwarding unit 409. If the session entry is not found, the session entry searching unit 406 is adapted to send the packet to the session entry establishing unit 407. The session entry searching unit 406 is generally implemented by the same module as that of the session entry storing unit 404.

The session entry establishing unit 407 is adapted to receive the packet from the session entry searching unit 406, search the security information entry storing unit 401 for at least one security information entry according to the stream attribute information carried in the packet, such as the 5-tuple information, send the security information entry found to the security-related processing unit 408, and establish a new session entry. The new session entry includes the 5-tuple information of the packet and the at least one security information entry found. The session entry establishing unit 407 is further adapted to search the FIB studying and storing unit 402 for a FIB entry according the destination IP address of the packet, search the ARP studying and storing unit 403 for an ARP entry matching the FIB entry, send the ARP entry to the forwarding unit 409, and search the security information entry storing unit 401 for at least one security information entry according to the layer-3 egress interface information in the FIB entry found, if the security information entry is found, send the at least one security information entry found to the security-related processing unit 408, add the at least one security information entry into the newly established session entry, and store the newly established session entry in the session entry storing unit 404. The session entry establishing unit 407 is generally implemented by the main control module shown in FIG. 2, or by the packet processing module and the main control module collaboratively.

The security-related processing unit 408 is adapted to receive the packet sent by the packet receiving unit 405, receive the at least one security information entry sent by the session entry searching unit 406 or the session entry establishing unit 407, implement security-related processing on the packet according to the at least one security information entry, and then send the packet to the forwarding unit 409. The security-related processing unit 408 is generally implemented by the packet processing module shown in FIG. 2.

The forwarding unit 409 is adapted to receive the packet which has been through the security-related processing from the security-related processing unit 408, receive the ARP entry from the session entry searching unit 406 or the session entry establishing unit 407, and forward the packet according to the ARP entry. The forwarding unit 409 is generally implemented by the packet processing module shown in FIG. 2.

In the present embodiment, the network security device may further include a FIB entry updating unit, which is adapted to update the FIB entry in the FIB studying and storing unit 402, and search the ARP studying and storing unit 403 after the FIB entry is updated for an ARP entry matching the updated FIB entry, and update the index of ARP entry in the FIB entry using the index of the ARP entry found.

In practice, the security information entry storing unit 401, FIB studying and storing unit 402, ARP studying and storing unit 403, session entry storing unit 404, session entry searching unit 406 and session entry establishing unit 407 can be collectively referred to as a service forwarding and associating module if classified by function.

Figure 5:
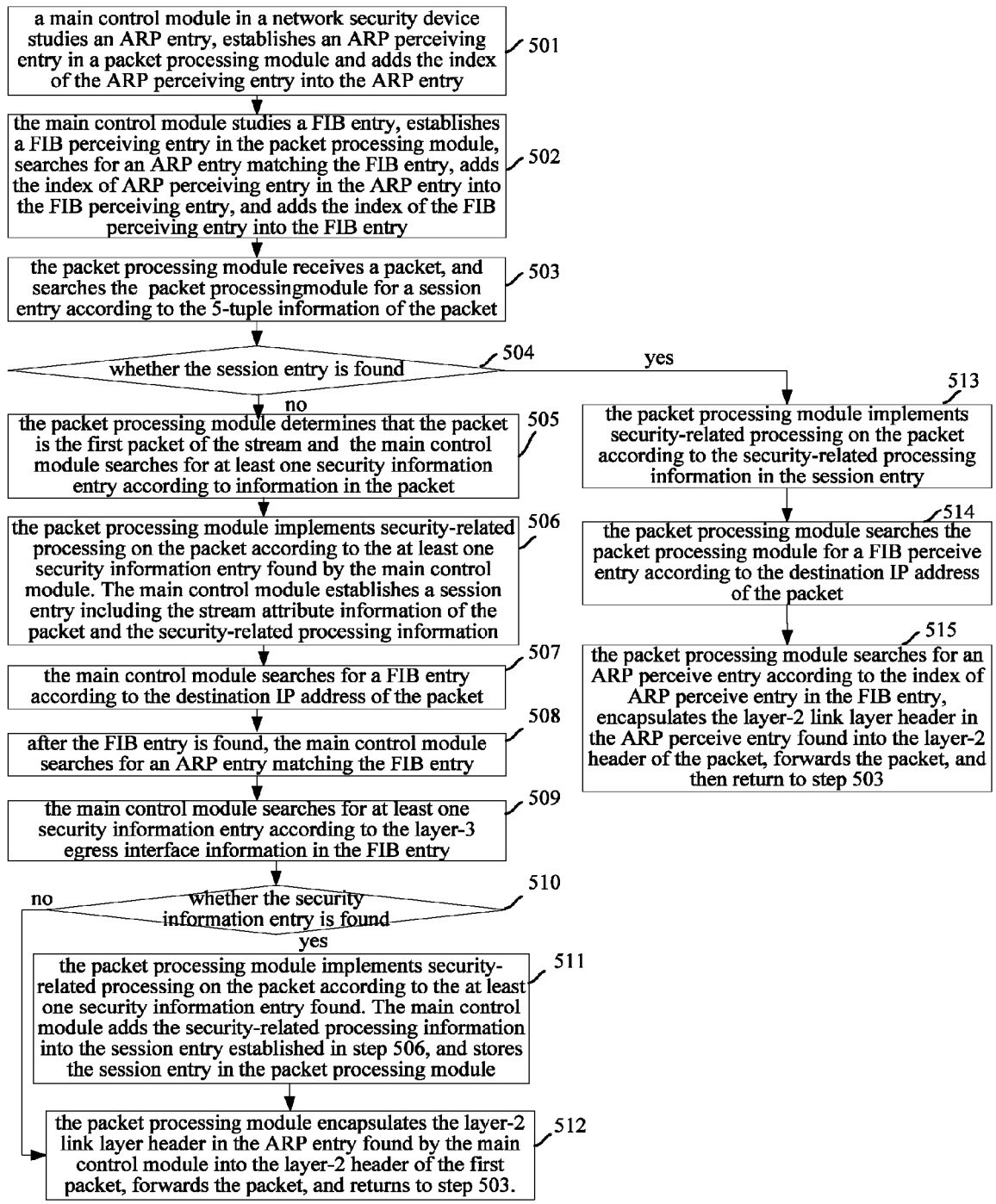
FIG. 5 is a flow chart illustrating a method for implementing security-related processing on packet in accordance with Embodiment one of the present invention.

FIG. 5 is a flow chart of a method for implementing security-related processing on packet in accordance with embodiment one of the present invention.

In step 501, a main control module in a network security device studies and stores an ARP entry, and establishes an ARP perceiving entry in a packet processing module in the network security device. The contents of the ARP perceiving entry are the same with the contents of the ARP entry studied.

After this step, the contents of the ARP entry and ARP perceiving entry are as follows:

the ARP entry includes: layer-3 egress interface+egress port+flag indicating "valid"+the length of link layer header+layer-2 link layer header+index of the ARP perceiving entry;

the ARP perceiving entry includes: layer-3 egress interface+egress port+flag indicating "valid"+the length of link layer header+layer-2 link layer header.

It can be seen that the difference between the ARP entry and ARP perceiving entry is that the ARP entry includes the index of the ARP perceiving entry.

When the ARP entry is updated, the ARP perceiving entry will be acquired according to the index of the ARP perceiving entry in the ARP entry, and be updated utilizing the contents of the update ARP entry.

In step 502, the main control module studies and stores a FIB entry, and establishes a FIB perceiving entry in the packet processing module. The contents of the FIB perceiving entry are identical with the contents of the FIB entry studied. The main control module searches for an ARP entry matching the FIB entry, adds the index of ARP perceiving entry in the ARP entry into the FIB perceiving entry, and adds the index of the FIB perceiving entry into the FIB entry stored in the main control module.

After this step, the contents of the FIB entry and the FIB perceiving entry are respectively as follows:
- the FIB entry includes: destination IP address+destination mask+layer-3 egress interface+next hop+index of FIB perceiving entry;
- the FIB perceiving entry includes: destination IP address+destination mask+layer-3 egress interface+next hop+index of ARP perceiving entry.

It can be seen that the difference between the FIB entry and FIB perceiving entry is that the FIB entry includes the index of the FIB perceiving entry, while the FIB perceiving entry includes the index of the ARP perceiving entry matching the FIB perceiving entry.

When the FIB entry is updated, the FIB perceiving entry will be acquired according to the index of the FIB perceiving entry in the FIB entry, and be updated utilizing the contents of the update FIB entry. Then an ARP entry matching the updated FIB entry is found, the index of ARP perceiving entry in the FIB perceiving entry is updated utilizing the index of the index of ARP perceiving entry in the ARP entry found.

In step 503, the packet processing module receives a packet, and searches the packet processing module for a session entry according to the stream attribute information of the packet, such as the 5-tuple information.

In step 504, the packet processing module determines whether the session entry is found. If the session entry is found, step 513 will be performed, otherwise, step 505 will be performed.

In step 505, the packet processing module determines that the packet is an initial packet of a stream, and instructs the main control module to search for at least one security information entry according to the stream attribute information carried in the initial packet.

In step 506, the packet processing module implements security-related processing on the initial packet according to security-related processing information in the at least one security information entry found by the main control module. The main control module establishes a new session entry which includes: the stream attribute information of the initial packet and the security-related processing information.

The main control module may find more than one security information entry, in which case the main control module may add information about all the security-related processing into the session entry.

In step 507, the main control module searches for a FIB entry according to the destination IP address of the initial packet.

In step 508, after finding the FIB entry, the main control module searches for an ARP entry matching the FIB entry.

In step 509, the main control module searches for at least one security information entry according to the layer-3 egress interface in the FIB entry.

In step 510, the main control module determines whether the security information entry is found. If the security information entry is found, step 511 is performed; otherwise, step 512 is performed.

In step 511, the packet processing module implements security-related processing on the initial packet according to security-related processing information in the at least one security information entry found. The main control module adds the security-related processing information into the session entry established in step 506, stores the session entry in the packet processing module, and step 512 is performed.

In step 512, the packet processing module encapsulates the layer-2 link layer header in the ARP entry found by the main control module into the layer-2 header of the initial packet, forwards the initial packet, and then returns to step 503.

In step 513, the packet processing module determines that the packet is a succeeding packet of the stream, implements security-related processing on the succeeding packet according to the security-related processing information in the session entry, and performs step 514.

In step 514, the packet processing module searches in the packet processing module for a FIB perceiving entry according to the destination IP address of the succeeding packet.

In step 515, the packet processing module searches for an ARP perceiving entry according to the index of ARP perceiving entry in the FIB perceiving entry found, encapsulates the layer-2 link layer header in the ARP perceiving entry found into the layer-2 header of the succeeding packet, forwards the packet, and returns to step 503.

From the flow shown in FIG. 5, it can be seen that:
- After studying an ARP entry, the main control module may store in the packet processing module an ARP perceiving entry corresponding to the ARP entry;
- after studying a FIB entry, the main control module may store in the packet processing module a FIB perceiving entry corresponding to the FIB entry, searches for an ARP entry matching the FIB entry and adds the index of ARP perceiving entry in the ARP entry into the FIB perceiving entry;
- when the main control module has performed searching of security information entry for an initial packet of a stream, a session entry stored in the packet processing module based on the searching result may include: stream attribute information and security-related processing information.

Therefore, when a succeeding packet of the stream is received by the packet processing module, the session entry will be found according to stream attribute information of the succeeding packet, such as the 5-tuple information. According to security-related processing information in the session entry, security-related processing will be performed on the succeeding packet. Then a FIB perceiving entry will be found in the packet processing module according to the destination IP address of the succeeding packet, and according to the index of ARP perceiving entry in the FIB perceiving entry, an ARP perceiving entry will be found in the packet processing module, according to which the succeeding packet will be forwarded. It can be seen that both the security-related processing and the forwarding of the succeeding packet are implemented within the packet processing module without participation of the main control module, which remarkably accelerates both the security-related processing and the forwarding of the succeeding packet. Especially when the packet processing module is implemented by hardware, e.g. logic devices such as FPGA and TCAM, the processing would be faster.

Figure 6:
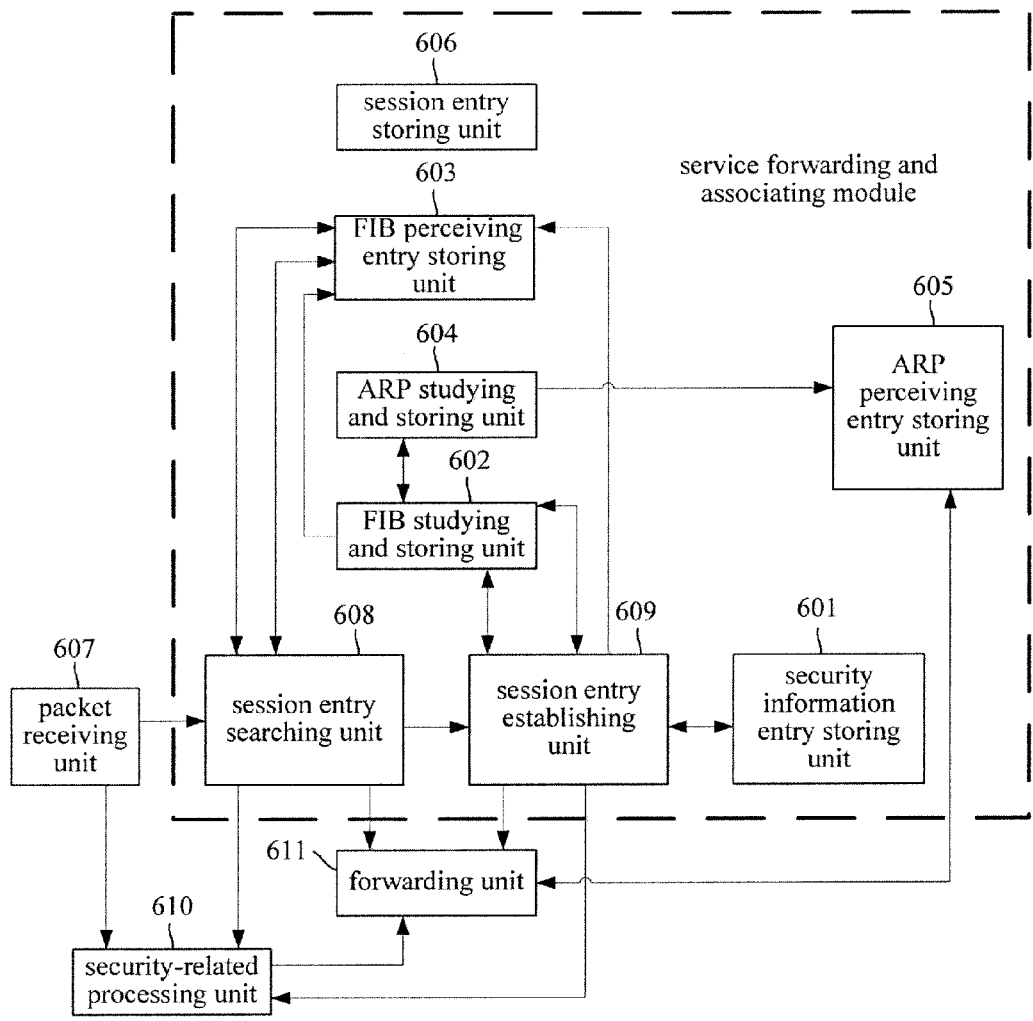
FIG. 6 is a schematic illustrating a structure of a network security device in accordance with Embodiment one of the present invention.

FIG. 6 is a schematic illustrating a structure of a network security device in accordance with Embodiment one of the present invention. As shown in FIG. 6, the network security device includes: security information entry storing unit 601, FIB studying and storing unit 602, FIB perceiving entry storing unit 603, ARP studying and storing unit 604, ARP perceiving entry storing unit 605, session entry storing unit 606, packet receiving unit 607, session entry searching unit 608, session entry establishing unit 609, security-related processing unit 610 and forwarding unit 611.

The security information entry storing unit 601 is adapted to store security information entries. Each security information entry includes 5-tuple information and/or forwarding information, and security-related processing information. The security information entry storing unit 601 is generally implemented by the main control module shown in FIG. 2.

The FIB studying and storing unit 602 is adapted to study and store a FIB entry, and search the ARP studying and storing unit 604 for an ARP entry matching the FIB entry, and establish a FIB perceiving entry in the FIB perceiving entry storing unit 603. Herein the FIB perceiving entry includes all the contents of the FIB entry and also includes the index of ARP perceiving entry in the ARP entry found. The FIB studying and storing unit 602 is further adapted to add the index of the FIB perceiving entry into the FIB entry studied. The FIB studying and storing unit 602 is generally implemented by the main control module shown in FIG. 2.

The FIB perceiving entry storing unit 603 is adapted to store FIB perceiving entries and is generally implemented by the packet processing module shown in FIG. 2.

The ARP studying and storing unit 604 is adapted to study and store an ARP entry and establish an ARP perceiving entry in the ARP perceiving entry storing unit 605. The contents of the ARP perceiving entry are identical with that of the ARP entry studied. The ARP studying and storing unit 604 is further adapted to add the index of the ARP perceiving entry into the ARP entry. The ARP studying and storing unit 604 is generally implemented by the main control module shown in FIG. 2.

The ARP perceiving entry storing unit 605 is adapted to store ARP perceiving entries and is generally implemented by the packet processing module shown in FIG. 2.

The session entry storing unit 606 is adapted to store session entries. Each session entry includes 5-tuple information and security-related processing information. The session entry storing unit 606 of this embodiment is implemented by the main control module shown in FIG. 2.

The packet receiving unit 607 is adapted to receive a packet, and send the packet to the security-related processing unit 610 and the session entry searching unit 608, and is generally implemented by the packet processing module shown in FIG. 2.

The session entry searching unit 608 is adapted to receive the packet from the packet receiving unit 607, search the session entry storing unit 606 for a session entry according to the 5-tuple information of the packet. If a session entry is found, the session entry searching unit 606 searches the FIB perceiving entry studying and storing unit 603 for a FIB perceiving entry according to the destination IP address of the packet, sends the security-related processing information in the session entry to the security-related processing unit 610, and sends the index of ARP perceiving entry in the FIB perceiving entry to the forwarding unit 611. If no session entry is found, the session entry searching unit 608 sends the packet to the session entry establishing unit 609. The session entry searching unit 608 of this embodiment is implemented by the packet processing module shown in FIG. 2.

The session entry establishing unit 609 is adapted to receive the packet from the session entry searching unit 608, search the security information entry storing unit 601 for at least one security information entry matching the information carried in the packet, such as the 5-tuple information; send the security-related processing information in the at least one security information entry found to the security-related processing unit 610, and establish a new session entry. The new session entry includes the 5-tuple information of the packet and the security-related processing information in the found security information entry. The session entry establishing unit 609 is further adapted to search the FIB studying and storing unit 602 for a FIB entry according to the destination IP address of the packet, search the ARP studying and storing unit 604 for an ARP entry matching the FIB entry, send the ARP entry to the forwarding unit 611, and search the security information entry storing unit 601 for at least one security information entry according to the layer-3 egress information in the found FIB entry. If a security information entry is found, the session entry establishing unit 609 is further adapted to send the security-related processing information in the at least one security information entry to the security-related processing unit 610, add the security-related processing information in the at least one security information entry into the session entry newly established, and store the newly established session entry in the session entry storing unit 606. The session entry establishing unit 609 of this embodiment is implemented by the main control module shown in FIG. 2.

The security-related processing unit 610 is adapted to receive the packet from the packet receiving unit 607, receive the security-related processing information sent from the session entry searching unit 608 or the session entry establishing unit 609, implement corresponding security-related processing on the packet, and then send the packet to the forwarding unit 611.

The forwarding unit 611 is adapted to receive the packet on which the security-related processing has been implemented and sent from the security-related processing unit 610, receive the index of ARP perceiving entry from the session entry searching unit 608, search the ARP perceiving entry storing unit 605 for the ARP perceiving entry according to the index of ARP perceiving entry, and forward the packet according to the ARP perceiving entry; or receive the ARP entry from the session entry establishing unit 609 and forward the packet according to the ARP entry.

The device of the present embodiment may further include a FIB entry updating unit, which is adapted to update a FIB entry in the FIB studying and storing unit 602, and after the FIB entry is updated, search the FIB perceiving entry storing unit 604 for a FIB perceiving entry according to the index of FIB perceiving entry in the FIB entry, search the ARP studying and storing unit 604 for an ARP entry matching the updated FIB entry, and update the contents of the FIB perceiving entry using the index of ARP perceiving entry in the ARP entry found and the contents of the FIB entry updated.

In practice, the security information entry storing unit 601, FIB studying and storing unit 602, FIB perceiving entry storing unit 603, ARP studying and storing unit 604, ARP perceiving entry storing unit 605, session entry storing unit 606, session entry searching unit 608 and session entry establishing unit 609 may be collectively referred to as service forwarding and associating module if classified by function.

It should be noted that the security information entry storing unit 601, FIB studying and storing unit 602 and ARP studying and storing unit 604 can be implemented as in the prior art, and are generally implemented by software. While the FIB perceiving entry storing unit 603, the ARP perceiving entry storing unit 605 and the session entry storing unit 606 are units provided by the embodiment of the present invention, and can be implemented by hardware, such as TCAM, so as to accelerate the accessing of session entry, FIB perceiving entry and ARP perceiving entry in the network security device and increase the packet forwarding efficiency based on the security service.

Embodiment Two

The packet forwarding process provided by the present embodiment mainly includes: the network security device searches for at least one security information entry, a FIB entry and an ARP entry for an initial packet of a stream as in the prior art, records information of all security-related processing implemented on the initial packet, and establishes a relationship among the stream attribute information carried in the initial packet and the information of all the security-related processing implemented on the initial packet and the FIB entry corresponding to the initial packet;

security-related processing is implemented on a succeeding packet of the stream according to the security-related processing information found via the established relationship. Then the ARP entry is found based on the FIB entry in the relationship, according to which the succeeding packet is forwarded.

From the above description it can be seen that since the relationship among the stream attribute information, the security-related processing information and the FIB entry is established when the initial packet of the stream is received, when a succeeding packet of the stream is received, the searching process for security information entry based on stream attribute information will not have to be implemented again for the succeeding packet, and so is the searching process for the FIB entry. Therefore, the security-related processing and the forwarding processing are accelerated and the processing efficiency is improved.

Preferably, when a FIB entry is studied, the network security device searches for an ARP entry matching the FIB entry, and establishes a relationship between the FIB entry and an ARP entry. Through establishing the relationship between the FIB entry and corresponding ARP entry, the searching process for ARP entry will not be performed, so the packet forwarding process is further accelerated and the processing efficiency is further improved.

Preferably in the present embodiment, when the FIB entry is updated after the session entry of the stream is established, in order to process a succeeding packet of the stream according to security information entry and ARP entry that match the updated FIB entry, a FIB sequence number can be added into the FIB entry and the session entry for indicating whether the FIB entry is updated. Alternatively, a flag can be added into the session entry. When the FIB entry is updated, the value of the flag in the session entry that is associated with the FIB entry is changed to indicate "invalid". Other methods may also be employed, for example, adding indexes of all session entries that are associated with the FIB entry into the FIB entry, when the FIB entry is updated, the security-related processing information in the session entries may be updated at the same time according to the indexes. These methods will not be illustrated herein one by one.

The present embodiment is further described in detail with reference to the drawings.

Figure 7:
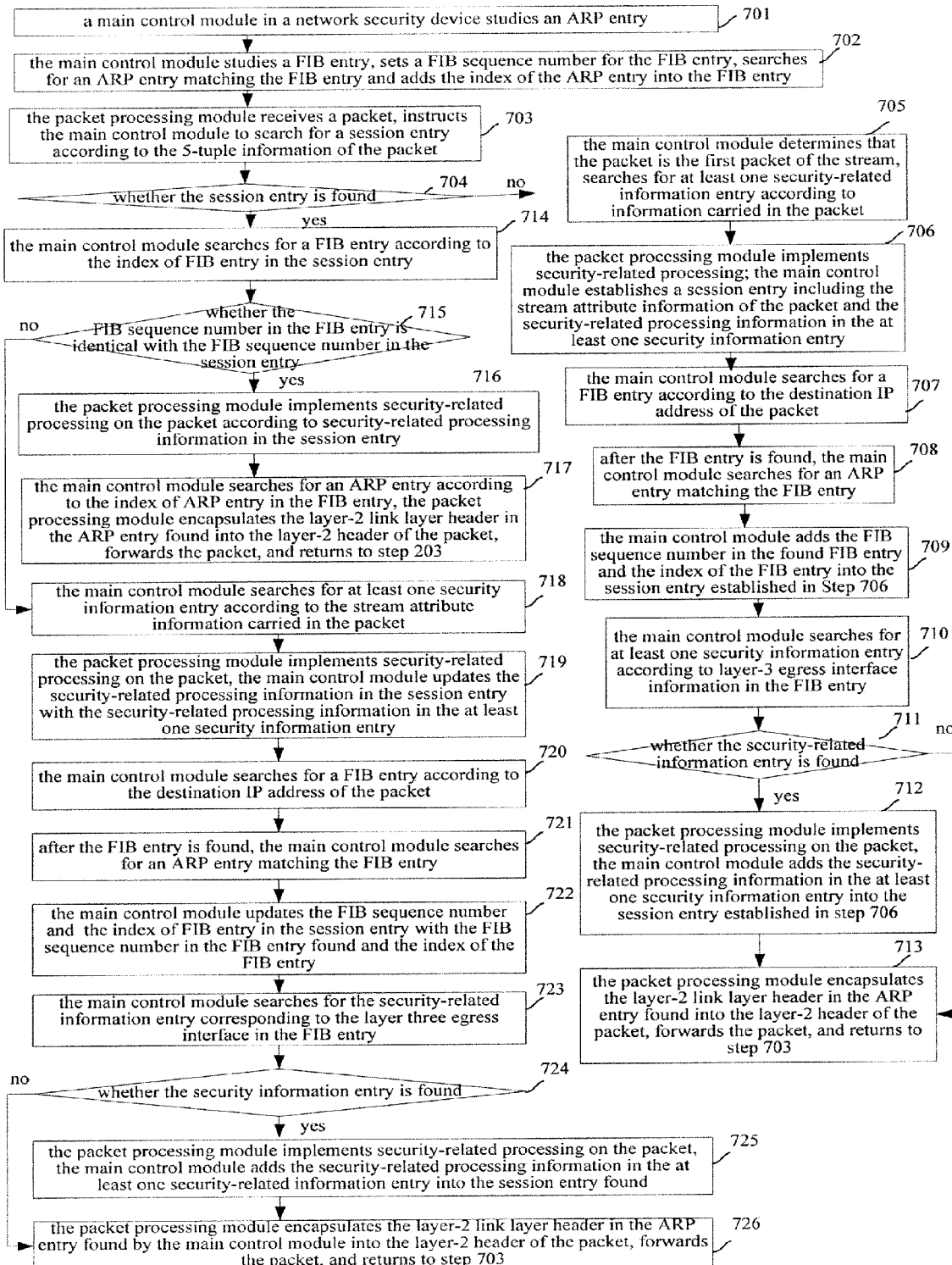
FIG. 7 is a flow chart illustrating a method for implementing security-related processing on packet in accordance with Embodiment two of the present invention.

FIG. 7 is a flow chart illustrating a method for implementing security-related processing on packet in accordance with Embodiment two of the present invention.

In step 701, a main control module in the network security device studies an ARP entry.

In step 702, the main control module studies a FIB entry, sets a FIB sequence number for the FIB entry, searches for an ARP entry matching the FIB entry and adds the index of the ARP entry into the FIB entry.

When the FIB entry is updated, for example, when the forwarding information, such as the layer-3 egress interface information, in the FIB entry is modified, the value of the FIB sequence number in the FIB entry can be increased by one. When the FIB entry is deleted, the value of the FIB sequence number in the FIB entry can also be increased by one. Thus, when the FIB entry is updated or deleted after a session entry is established for a stream, the value of the FIB sequence number in FIB entry will be inconsistent with the value of the FIB sequence number in the session entry, then a process for updating the index of FIB entry and the FIB sequence number in the session entry will be triggered.

In step 703, a packet processing module receives a packet, instructs the main control module to search for a session entry according to the stream attribute information of the packet, such as the 5-tuple information.

In step 704, the main control module determines whether a session entry is found. If a session entry is found, step 714 is performed; otherwise, step 705 is performed.

In step 705, the main control module determines that the packet is the initial packet of the stream, and searches for at least one security information entry according to the stream attribute information carried in the initial packet.

In step 706, the packet processing module implements security-related processing on the initial packet according to the security-related processing information in the at least one security information entry found by the main control module. The main control module establishes a new session entry. The session entry includes the stream attribute information of the initial packet and the security-related processing information.

The security-related processing in this step includes packet processing for in-domain of the network security device.

In step 707, the main control module searches for a FIB entry according to the destination IP address of the initial packet.

In step 708, after the FIB entry is found, the main control module searches for an ARP entry matching the FIB entry.

In step 709, the main control module adds the FIB sequence number in the FIB entry and the index of the FIB entry into the session entry established in step 706.

It can be seen that after this step, the session entry established by the main control module includes the stream attribute information, the security-related processing information, the index of the FIB entry and the FIB sequence number.

In step 710, the main control module searches for at least one security information entry according to the layer-3 egress interface information in the FIB entry.

The FIB entry includes destination IP address information, destination mask information, layer-3 egress interface information and next hop information.

In step 711, the main control module determines whether the security information entry is found. If the security information entry is found, step 712 is performed; otherwise, step 713 is performed.

In step 712, the packet processing module implements security-related processing on the initial packet according to the security-related processing information in the at least one security information entry found by the main control module. The main control module adds the security-related processing information in the at least one security information entry into the session entry established in step 706. After the processing is completed, step 713 is performed.

The security-related processing in this step includes packet processing for out-domain of the network security device.

In step 713, the packet processing module encapsulates the layer-2 link layer header in the ARP entry found into the layer-2 header of the initial packet, forwards the packet, and then returns to step 703.

In step 714, the main control module determines that the packet is a succeeding packet of the stream, searches for a FIB entry according to the index of FIB entry in the session entry.

In step 715, the main control module determines whether the FIB sequence number in the FIB entry found is identical with the FIB sequence number in the session entry. If the two are identical, step 716 is performed, otherwise step 718 is performed.

In step 716, the main control module determines that the FIB entry has not been updated or deleted, the packet processing module implements security-related processing on the succeeding packet according to the security-related processing information in the session entry. After the processing is completed, step 717 is performed.

In step 717, the main control module searches for an ARP entry according to the index of ARP entry in the FIB entry. The packet processing module encapsulates the layer-2 link layer header in the ARP entry found into the layer-2 header of the succeeding packet, forwards the packet, and returns to step 703.

In step 718, the main control module determines that the FIB entry has been updated or deleted, and searches for at least one security information entry according to the stream attribute information carried in the succeeding packet.

In step 719, the packet processing module implements security-related processing on the succeeding packet according to the security-related processing information in the at least one security information entry found by the main control module. The main control module updates the security-related processing information in the session entry found with the security-related processing information in the at least one security information entry.

In step 720, the main control module searches for a FIB entry according to the destination IP address of the succeeding packet.

In step 721, after the FIB entry is found, the main control module searches for an ARP entry matching the FIB entry.

In step 722, the main control module updates the FIB sequence number and the index of FIB entry in the session entry with the FIB sequence number in the FIB entry found and the index of the FIB entry found.

In step 723, the main control module searches for at least one security information entry according to the layer-3 egress interface information in the FIB entry found.

In step 724, the main control module determines whether the security information entry is found. If the security information entry is found, step 725 is performed; otherwise, step 726 is perforated.

In step 725, the packet processing module implements security-related processing on the succeeding packet according to the security-related processing information in the at least one security information entry found by the main control module. The main control module adds the security-related processing information in the at least one security information entry into the session entry found. After the processing is completed, step 726 is performed.

In step 726, the packet processing module encapsulates the layer-2 link layer header in the ARP entry found by the main control module into the layer-2 header of the succeeding packet, forwards the packet, and returns to step 703.

From the process shown in FIG. 7 it can be seen that, after a FIB entry is studied by the main control module, an ARP entry matching the FIB entry is found and the index of the ARP entry is added into the FIB entry.

After the main control module searches for the security information entry, the FIB entry and the ARP entry for the initial packet of the stream, the session entry established based on the searching result includes the stream attribute information, the security-related processing information, the index of the FIB entry and the FIB sequence number.

Therefore, when a succeeding packet of the stream is received by the packet processing module, the main control module is triggered to search for the session entry according to the stream attribute information of the succeeding packet, and the packet processing module implements the security-related processing on the succeeding packet according to the security-related processing information in the session entry. The main control module searches for a FIB entry according to the index of FIB entry in the session entry and searches for an ARP entry according to the index of ARP entry in the FIB entry. Then the packet is forwarded by the packet processing module. It can be seen that all the security-related processing information is stored together in the session entry, so that the security-related processing efficiency is improved. In the searching process for ARP entry, the searching process for FIB entry according to the stream attribute information and the searching processing for an ARP entry matching the FIB entry will not have to be performed, since the ARP entry can be directly obtained according the index of ARP entry in the FIB entry, so the packet forwarding efficiency is further improved.

Figure 8:
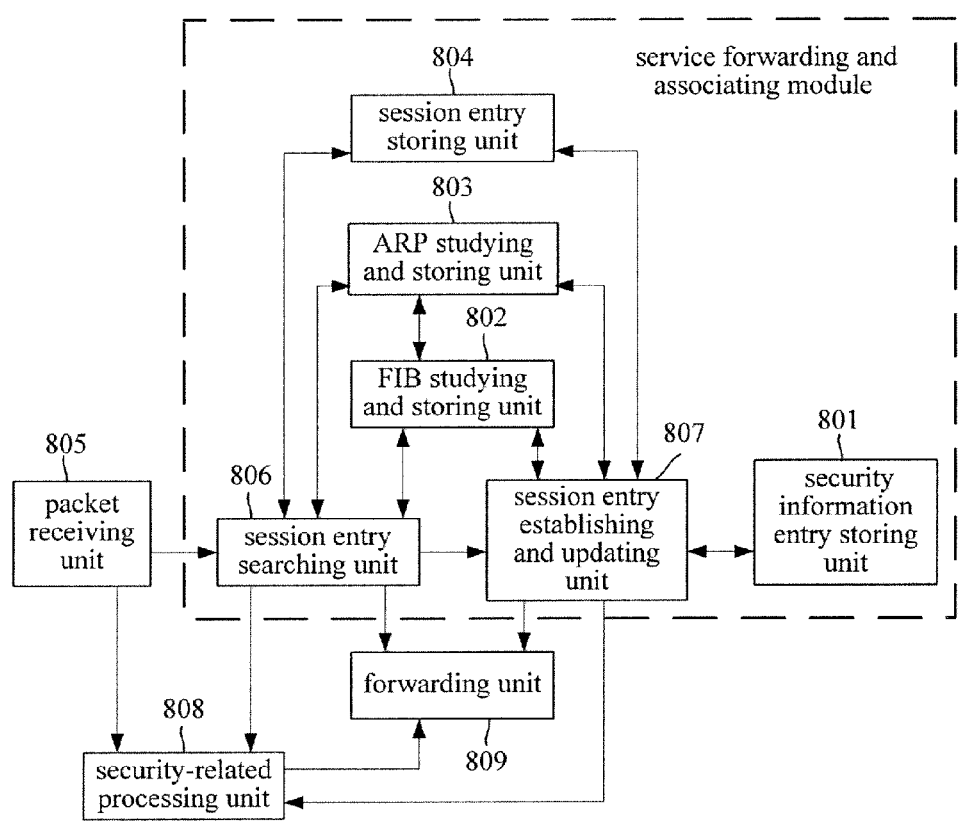
FIG. 8 is a schematic illustrating a structure of a network security device in accordance with Embodiment two of the present invention.

FIG. 8 is a schematic diagram illustrating a structure of a network security system in accordance with Embodiment two of the present invention. As shown in FIG. 8, the system includes security information entry storing unit 801, FIB studying and storing unit 802, ARP studying and storing unit 803, session entry storing unit 804, packet receiving unit 805, session entry searching unit 806, session entry establishing and updating unit 807, security-related processing unit 808 and a forwarding unit 809.

The security information entry storing unit 801 is adapted to store security information entries. Each security information entry includes 5-tuple information and/or forwarding information, and security-related processing information.

The FIB studying and storing unit 802 is adapted to study and store a FIB entry, and set a FIB sequence number for the FIB entry. The FIB entry includes destination IP address information, destination mask information, layer-3 egress interface information, next hop information, and the FIB sequence number etc. The FIB studying and storing unit 802 is further adapted to search the ARP studying and storing unit 803 for an ARP entry matching the FIB entry and add the index of the ARP entry into the FIB entry.

The ARP studying and storing unit 803 is adapted to study and store an ARP entry.

The session entry storing unit 804 is adapted to store session entries. Each session entry includes 5-tuple information, security-related processing information, index of FIB entry, and a FIB sequence number.

The packet receiving unit 805 is adapted to receive a packet, and send the packet to the security-related processing unit 808 and session entry searching unit 806.

The session entry searching unit 806 is adapted to receive the packet from the packet receiving unit 805, search the session entry storing unit 804 for a session entry according to the 5-tuple information of the packet. If the session entry is found, the session entry searching unit 806 is further adapted to search the FIB studying and storing unit 802 for a FIB entry according to the index of FIB entry in the session entry, determine whether the FIB sequence number in the FIB entry found is identical with the FIB sequence number in the session entry. If the two are identical, the session entry searching unit 806 is further adapted to send the security-related processing information in the session entry to the security-related processing unit 808, search the ARP studying and storing unit 803 for an ARP entry according to the index of ARP entry in the FIB entry, and send the ARP entry to the forwarding unit 809. If the two are not identical, the session entry searching unit 806 is further adapted to send an updating indication including the packet and the index of the session entry to the session entry establishing and updating unit 807. If the session entry is not found, the session entry searching unit 806 is further adapted to send an establishing indication including the packet to the session entry establishing and updating unit 807.

The session entry establishing and updating unit 807 is adapted to receive the establishing indication from the session entry searching unit 806, search the security information entry storing unit 801 for at least one security information entry according to the information carried in the packet, such as the 5-tuple information, send the security information entry found to the security-related processing unit 808, and establish a new session entry in the session entry storing unit 804. The new session entry includes the 5-tuple information of the packet and the security-related processing information in the at least one security information entry found. The session entry establishing and updating unit 807 is further adapted to search the FIB studying and storing unit 802 for a FIB entry according to the destination IP address of the packet, add the FIB sequence number in the FIB entry and the index of the FIB entry into the session entry established, search the ARP studying and storing unit 803 for an ARP entry matching the FIB entry, send the ARP entry to the forwarding unit 809, and search the security information entry storing unit 801 for at least one security information entry according to the layer-3 egress information in the FIB entry found, if the security information entry is found, send the security information entry to the security-related processing unit 808 and add the security-related processing information in the at least one security information entry into the session entry established in the session entry storing unit 804. The session entry establishing and updating unit 807 is further adapted to receive the updating indication including the packet and the index of session entry from the session entry searching unit 806, search the security information entry storing unit 801 for at least one security information entry according to information carried in the packet, such as the 5-tuple information, send the security-related processing information in the at least one security information entry found to the security-related processing unit 808, search the session entry storing unit 804 for the session entry according to the index of session entry, update the security-related processing information in the session entry with the security-related processing information in the at least one security information entry, search the FIB studying and storing unit 802 for a FIB entry according the destination IP address of the packet, update the FIB sequence number and the index of FIB entry in the session entry with the FIB sequence number in the FIB entry and the index of the FIB entry found, search the ARP studying and storing unit 803 for an ARP entry matching the FIB entry, send the ARP entry to the forwarding unit 809, and search the security information entry storing unit 801 for at least one security information entry according to the layer-3 egress information in the FIB entry found, if the security information entry is found, send the security-related processing information in the at least one security information entry found to the security-related processing unit 808 and add the security-related processing information in the at least one security information entry into the session entry.

The security-related processing unit 808 is adapted to receive the packet from the packet receiving unit 805, receive the security-related processing information from the session entry searching unit 806 or the session entry establishing and updating unit 807, implement security-related processing on the packet according to the security-related processing information, and send the packet to the forwarding unit 809.

The forwarding unit 809 is adapted to receive the packet processed through the security-related processing and sent from the security-related processing unit 808, receive the ARP entry sent from the session entry searching unit 806 or the session entry establishing and updating unit 807, and forward the packet according to the ARP entry.

In the present embodiment, the system may further include a FIB entry updating unit, adapted to update a FIB entry in the FIB studying and storing unit 802, and when the FIB entry is updated, increase the value of the FIB sequence number in the FIB entry by one.

In practice, the security information entry storing unit 801, the FIB studying and storing unit 802, the ARP studying and storing unit 803, the session entry storing unit 804, the session entry searching unit 806 and the session entry establishing and updating unit 807 can be collectively called service forwarding and associating module if classified by function.

In the embodiment shown in FIG. 7, the main control module implements the searching for both the security-related processing information and the forwarding information for a succeeding packet of the stream. An embodiment where the packet processing module implements the searching for the security-related processing information and the forwarding information for the succeeding packet of the stream will be described as follows.

Figure 9:
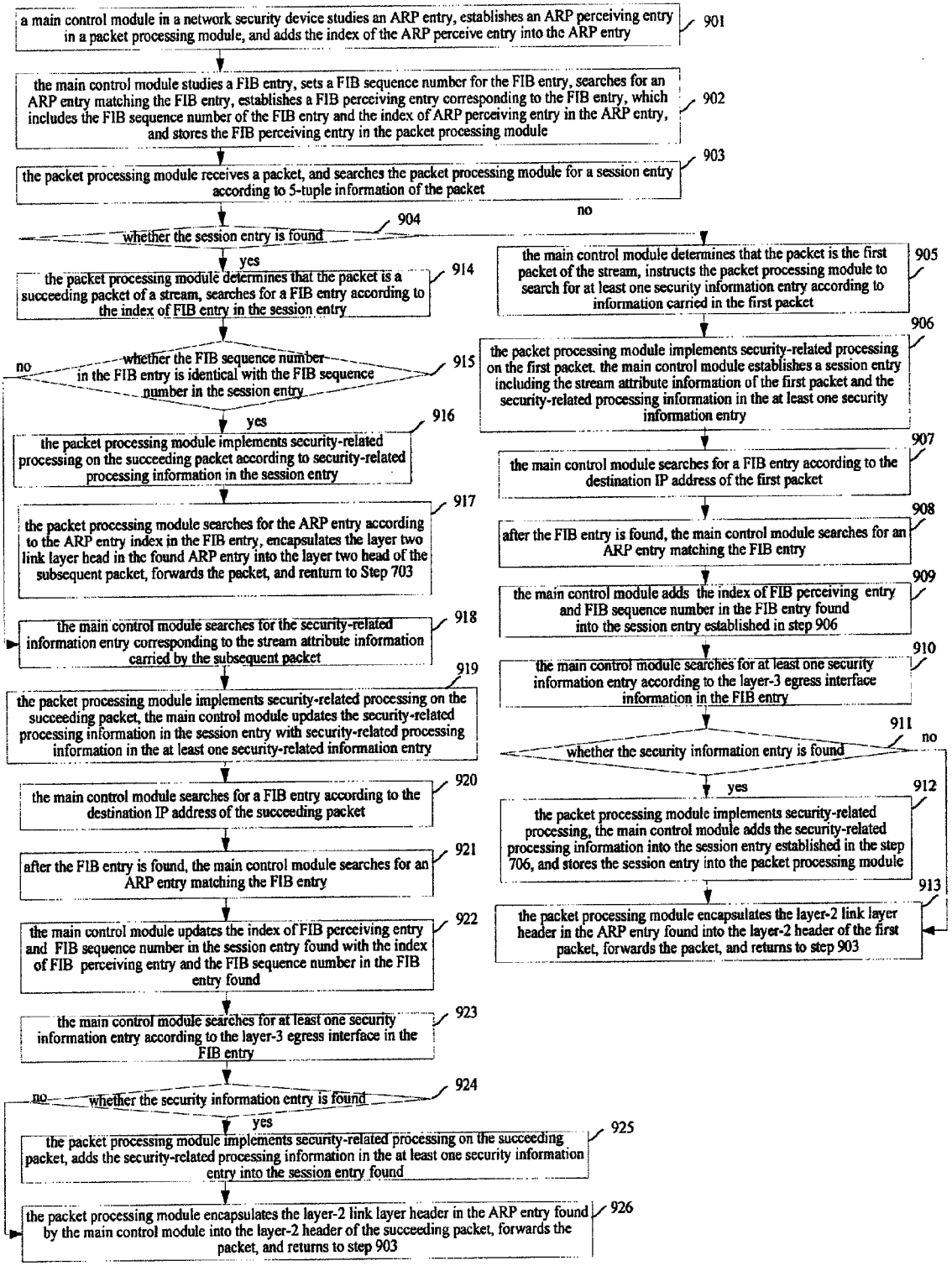
FIG. 9 is a flow chart illustrating a method for implementing security-related processing on packet in accordance with Embodiment two of the present invention.

FIG. 9 is a flow chart illustrating a method for implementing security-related processing on packet in accordance with Embodiment two of the present invention.

In step 901, a main control module in a network security device studies an ARP entry, and establishes an ARP perceiving entry in a packet processing module. The contents of the ARP perceiving entry are identical with the contents of the ARP entry. The main control module adds the index of the ARP perceiving entry into the ARP entry studied by the main control module.

In step 902, the main control module in the network security device studies a FIB entry, sets a FIB sequence number for the FIB entry, searches for an ARP entry matching the FIB entry, and establishes a FIB perceiving entry corresponding to the FIB entry. The FIB perceiving entry includes the FIB sequence number of the FIB entry and the index of ARP perceiving entry in the ARP entry found. The main control module further stores the FIB perceiving entry into the packet processing module.

When the forwarding information in the FIB entry, such as layer-3 egress interface information, is modified, the value of the FIB sequence number in the FIB entry can be increased by one, the FIB perceiving entry is obtained according to the index of FIB perceiving entry in the FIB entry, and the FIB sequence number in the FIB perceiving entry should also be increased by one. When the FIB entry is deleted, the FIB perceiving entry is also obtained according to the index of FIB perceiving entry in the FIB entry, and the FIB sequence number in the FIB perceiving entry also increases by one. Therefore, after the FIB entry is updated or deleted, the FIB sequence number in the FIB perceiving entry will be inconsistent with the FIB sequence number in the session entry established before the FIB entry is updated, so a process for updating the index of FIB perceiving entry and the FIB sequence number in the session entry will be triggered.

In step 903, the packet processing module receives a packet, and searches the packet processing module for a session entry according to the stream attribute information of the packet, such as the 5-tuple information.

In step 904, the packet processing module determines whether the session entry is found. If the session entry is found, step 914 is performed; otherwise, step 905 is performed.

In step 905, the packet processing module determines that the packet is the initial packet of the stream, and instructs the main control module to search for at least one security information entry according to the stream attribute information carried in the initial packet.

In step 906, the packet processing module implements security-related processing on the initial packet according to security-related processing information in the at least one security information entry found by the main control module. The main control module establishes a session entry which includes: the stream attribute information of the initial packet and the security-related processing information.

In step 907, the main control module searches for a FIB entry according to the destination IP address of the initial packet.

In step 908, after the FIB entry is found, the main control module searches for an ARP entry matching the FIB entry.

In step 909, the main control module adds the FIB sequence number and the index of FIB perceiving entry in the FIB entry into the session entry established in step 906.

It can be seen that after this step, the session entry established by the main control module includes the stream attribute information, the security-related processing information, the index of FIB perceiving entry and the FIB sequence number.

In step 910, the main control module searches for at least one security information entry according to the layer-3 egress interface information in the FIB entry.

In step 911, the main control module determines whether the security information entry is found. If the security information entry is found, step 912 is performed, otherwise step 913 is performed.

In step 912, the packet processing module implements security-related processing on the initial packet according to the security-related processing information in the at least one security information entry found by the main control module. The main control module adds the security-related processing information into the session entry established in step 906. After the processing is completed, step 913 is performed.

In step 913, the packet processing module encapsulates the layer-2 link layer header in the ARP entry found by the main control module into the layer-2 header of the initial packet, forwards the packet, and returns to step 903.

In step 914, the main control module determines that the packet is a succeeding packet of the stream, searches for a FIB perceiving entry according to the index of FIB perceiving entry in the session entry.

In step 915, the packet processing module determines whether the FIB sequence number in the FIB perceiving entry found is identical with the FIB sequence number in the session entry. If they are identical, step 916 is performed, otherwise step 918 is performed.

In step 916, the packet processing module determines that the FIB entry has not been updated or deleted, implements security-related processing on the succeeding packet according to the security-related processing information in the session entry. After the processing is completed, step 917 is performed.

In step 917, the packet processing module searches for an ARP perceiving entry according to the index of ARP perceiving entry in the FIB perceiving entry, encapsulates the layer-2 link layer header in the ARP perceiving entry found into the layer-2 header of the succeeding packet, forwards the packet, and returns to step 903.

In step 918, the packet processing module determines that the FIB entry has been updated or deleted and instructs the main control module to search for at least one security information entry according to the stream attribute information carried in the succeeding packet, such as the 5-tuple information.

In step 919, the packet processing module implements security-related processing on the succeeding packet according to the security-related processing information in the at least one security information entry found by the main control module. The main control module updates the security-related processing information in the session entry with the security-related processing information in the at least one security information entry found.

In step 920, the main control module searches for a FIB entry according to the destination IP address of the succeeding packet.

In step 921, after finding the FIB entry, the main control module searches for an ARP entry matching the FIB entry.

In step 922, the main control module updates the FIB sequence number and the index of FIB perceiving entry in the session entry found with the FIB sequence number and the index of FIB perceiving entry in the FIB entry found.

In step 923, the main control module searches for at least one security information entry according to the layer-3 egress interface information in the FIB entry.

In step 924, the main control module determines whether the security information entry is found. If the security information entry is found, step 925 is performed; and otherwise step 926 is performed.

In step 925, the packet processing module implements security-related processing on the succeeding packet according to the security-related processing information in the at least one security information entry found by the main control module. The main control module adds the security-related processing information into the session entry found. After the processing is completed, step 926 is performed.

In step 926, the packet processing module encapsulates the layer-2 link layer header in the ARP entry found into the layer-2 header of the succeeding packet, forwards the packet, and returns to step 903.

From the process shown in FIG. 9 it can be seen that after an ARP entry is studied by the main control module, an ARP perceiving entry corresponding to the ARP entry would be stored in the packet processing module, and the index of the ARP perceiving entry is added into the ARP entry studied by the main control module.

When a FIB entry is studied by the main control module, a FIB perceiving entry established in the packet may include a FIB sequence number and an index of ARP perceiving entry.

After the main control module performed searching for security information entry, FIB entry and ARP entry for the initial packet of the stream, and recorded information of all security-related processing implemented on the initial packet, a session entry is stored in the packet processing module. The session entry includes stream attribute information, security-related processing information, an index of FIB perceiving entry and a FIB sequence number.

Therefore, when a succeeding packet of the stream is received, the packet processing module would search for the session entry in the packet processing module according to the stream attribute information of the succeeding packet, and implement security-related processing according to the security-related processing information in the session entry, obtain a FIB perceiving entry in the packet processing module according to the index of FIB perceiving entry in the session entry, obtain an ARP perceiving entry in the packet processing module according to the index of ARP perceiving entry in the FIB perceiving entry, and forward the succeeding packet. It can be seen that both the security-related processing and the forwarding of the succeeding packet are implemented in the packet processing module without participation of the main control module, which greatly improves the efficiency of both the security-related processing and the forwarding of the succeeding packet. Meanwhile, information of all security-related processing to be implemented on the succeeding packet is stored together in the session entry, through which the efficiency of the security-related processing is further improved. When searching for a ARP perceiving entry, it is not necessary to search for a FIB entry according to the stream attribute information and searching for an ARP entry matching the FIB entry, a FIB perceiving entry can be directly acquired according to the index of FIB perceiving entry in the session entry, and the ARP perceiving entry can be directly acquired according to the index of ARP perceiving entry in the FIB perceiving entry, thus the forwarding efficiency is further improved.

Also, from the process shown in FIG. 9 it can be seen that, the difference between a FIB entry of the present invention and a FIB entry of the prior art lies in that the FIB entry of the present invention additionally stores an index of a FIB perceiving entry. When the FIB entry is modified or deleted, the FIB sequence number in the FIB perceiving entry can be updated at the same time, so that the index of FIB perceiving entry and the FIB sequence number in the session entry can be updated in time.

In the process shown in FIG. 9, to further accelerate the security-based packet forwarding, the FIB perceive entry and the session entry are stored in the packet processing module, the ARP perceiving entry which has the same contents with the ARP entry is also stored in the packet processing module, and the packet processing module is implemented by hardware means. In practice, the packet processing module can also be implemented by software means; the FIB perceiving entry and the session entry can also be stored in software (the main control module or the packet processing module); the ARP perceiving entry may not be stored, in which case, the FIB perceiving entry stores an index of ARP entry instead of an index of ARP perceiving entry. The security-related processing and the forwarding of the succeeding packet of the stream can both be implemented by software means, and the process is similar to that shown in FIG. 9, thus it would not be described here in detail.

Figure 10:
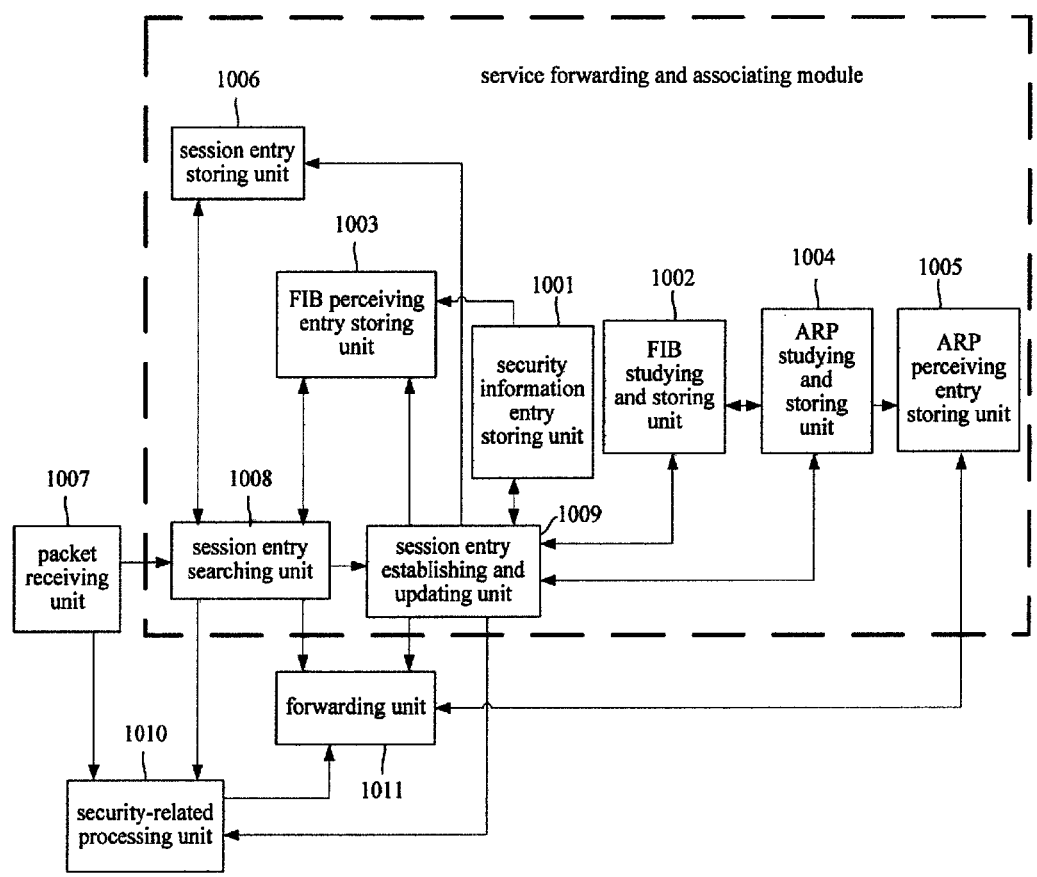
FIG. 10 is a schematic illustrating a structure of a network security device in accordance with Embodiment two of the present invention.

FIG. 10 is a schematic diagram illustrating a structure of a network security device in accordance with Embodiment two of the present invention. As shown in FIG. 10, the device mainly includes a security information entry storing unit 1001, a FIB studying and storing unit 1002, a FIB perceiving entry storing unit 1003, an ARP studying and storing unit 1004, an ARP perceiving entry storing unit 1005, a session entry storing unit 1006, a packet receiving unit 1007, a session entry searching unit 1008, a session entry establishing and updating unit 1009, a security-related processing unit 1010 and a forwarding unit 1011.

The security information entry storing unit 1001 is adapted to store security information entries. Each security information entry includes 5-tuple information and/or forwarding information, and security-related processing information.

The FIB studying and storing unit 1002 is adapted to study and store a FIB entry, and set a FIB sequence number for the FIB entry. Each FIB entry includes destination IP address information, destination mask information, layer-3 egress interface information, next hop information, a FIB sequence number, and etc. The FIB studying and storing unit 1002 is further adapted to search the ARP studying and storing unit 1004 for an ARP entry matching the FIB entry, and establish a FIB perceiving entry in the FIB perceiving entry storing unit 1003. The FIB perceiving entry includes the index of ARP perceiving entry in the ARP entry found and the FIB sequence number in the FIB entry. The FIB studying and storing unit 1002 is further adapted to add the index of the FIB perceiving entry into the FIB entry.

The FIB perceiving entry storing unit 1003 is adapted to store FIB perceiving entries. Each FIB perceiving entry includes an index of ARP perceiving entry and a FIB sequence number.

The ARP studying and storing unit 1004 is adapted to study and store an ARP entry, and establish an ARP perceiving entry in the ARP perceiving entry storing unit 1005. The contents of the ARP perceiving entry is the same with that of the ARP entry. The ARP studying and storing unit 1004 is further adapted to add the index of the ARP perceiving entry into the ARP entry.

The ARP perceiving entry storing unit 1005 is adapted to store ARP perceiving entries.

The session entry storing unit 1006 is adapted to store session entries. Each session entry includes 5-tuple information, at least one security information entry, an index of FIB perceiving entry and a FIB sequence number.

The packet receiving unit 1007 is adapted to receive a packet, and send the packet to the security-related processing unit 1010 and the session entry searching unit 1008.

The session entry searching unit 1008 is adapted to receive the packet from the packet receiving unit 1007, search the session entry storing unit 1006 for a session entry according to the 5-tuple information of the packet. If the session entry is found, the session entry searching unit 1006 is further adapted to search the FIB perceiving entry studying and storing unit 1003 for a FIB perceiving entry according to the index of FIB perceiving entry in the session entry, determine whether the FIB sequence number in the FIB perceiving entry is found identical with the FIB sequence number in the session entry, if the two are identical, send the security-related processing information corresponding to the at least one security information entry in the session entry to the security-related processing unit 1001 and send the index of ARP perceiving entry in the FIB perceiving entry to the forwarding unit 1001; if the two are not identical, send an updating indication carrying the packet and the index of the session entry found to the session entry establishing and updating unit 1009. If the session entry is not found, the session entry searching unit 1008 is further adapted to send an establishing indication carrying the packet to the session entry establishing and updating unit 1009.

The session entry establishing and updating unit 1009 is adapted to receive the establishing indication carrying the packet from the session entry searching unit 1008, search the security information entry storing unit 1001 for at least one security information entry according to information carried in the packet, such as the 5-tuple information, send the security-related processing information corresponding to the at least one security information entry found to the security-related processing unit 1010, and establish a new session entry. The new session entry includes the 5-tuple information of the packet and the at least one security information entry found. The session entry establishing and updating unit 1009 is further adapted to search the FIB studying and storing unit 1002 for a FIB entry according to the destination IP address of the packet, add the index of FIB perceiving entry and the FIB sequence number in the FIB entry into the session entry established, search the ARP studying and storing unit 1004 for an ARP entry matching the FIB entry, send the ARP entry to the forwarding unit 1011, and search the security information entry storing unit 1001 for at least one security information entry according to the layer-3 egress information in the FIB entry found. If the security information entry is found, the session entry establishing and updating unit 1009 is further adapted to send the security-related processing information corresponding to the at least one security information entry to the security-related processing unit 1010 and add the security-related processing information corresponding to the at least one security information entry into the newly established session entry, and store the session entry in the session entry storing module 1006. The session entry establishing and updating unit 1009 is also further adapted to receive the updating indication which carries the packet and the index of the session entry from the session entry searching unit 1008, search the security information entry storing unit 1001 for at least one security information entry according to the 5-tuple information, send the security-related processing information corresponding to the at least one security information entry found to the security-related processing unit 1010, search the session entry storing unit 1006 for a session entry according to the index of the session entry, update the security-related processing information in the session entry with the security-related processing information corresponding to the at least one security information entry found, search the FIB studying and storing unit 1002 for a FIB entry according to the destination IP address of the packet, update the index of FIB perceiving entry and the FIB sequence number in the session entry with the index of FIB perceiving entry and the FIB sequence number in the FIB entry found, search the ARP studying and storing unit 1004 for an ARP entry matching the FIB entry, send the ARP entry found to the forwarding unit 1011, and search the security information entry storing unit 1011 for at least one security information entry according to the layer-3 egress information in the FIB entry found. If the security information entry is found, the session entry establishing and updating unit 1009 is further adapted to send the security-related processing information corresponding to the at least one security information entry found to the security-related processing unit 1010 and add the security-related processing information corresponding to the at least one security information entry into the session entry.

The security-related processing unit 1010 is adapted to receive the packet from the packet receiving unit 1007, receive the security-related processing information from the session entry searching unit 1008 or the session entry establishing unit 1009, implement security-related processing on the packet according to the security-related processing information, and send the packet to the forwarding unit 1011.

The forwarding unit 1011 is adapted to receive the packet processed through the security-related processing and sent from the security-related processing unit 1010, receive the index of ARP perceiving entry from the session entry searching unit 1008, search the ARP perceiving entry storing unit 1005 for the ARP perceiving entry based on the index of ARP perceiving entry, and forward the packet according to the ARP perceiving entry; or receive the ARP entry from the session entry establishing unit 1009, and forward the packet according to the ARP entry.

In the present embodiment, the device may further include a FIB entry updating unit, which is adapted to update a FIB entry in the FIB studying and storing unit 1002, and when the FIB entry is updated, make the FIB sequence number of the FIB entry increase by one, search the FIB perceiving entry storing unit 1003 for a FIB perceiving entry according to the index of FIB perceiving entry in the FIB entry, and make the FIB sequence number in the FIB perceiving entry increase by one.

In practice, the security information entry storing unit 1001, the FIB studying and storing unit 1002, the FIB perceiving entry storing unit 1003, the ARP studying and storing unit 1004, the ARP perceiving entry storing unit 1005, the session entry storing unit 1006, the session entry searching unit 1008 and the session entry establishing unit 1009 can be collectively called a service forwarding and associating module if classified by function.

It should be noted that the security information entry storing unit 1001, the FIB studying and storing unit 1002 and the ARP studying and storing unit 1004 are units existing in the prior art and can be implemented by the main control module. While the FIB perceiving entry storing unit 1003, the ARP perceiving entry storing unit 1005 and the session entry storing unit 1006 are units provided by the embodiment of the present invention and can be implemented by the packet processing module. The packet processing module may be implemented by software or logic devices. When the packet processing module is implemented by logic devices, such as TCAM and FPGA, the accessing of session entry, the FIB perceiving entry and ARP perceiving entry by the network security device can be accelerated and the efficiency of packet forwarding based on security service can be improved.

In addition, in the practice, the FIB perceiving entry storing unit 1003 and the session entry storing unit 1006 may also be implemented by the main control module, in which case the ARP perceiving entry storing unit 1005 in the packet processing module will not be needed and functions of the FIB studying and storing unit 1002, the ARP studying and storing unit 1004, the session entry searching unit 1008 and the forwarding unit 1011 should be modified as follows. The FIB perceiving entry established by the FIB studying and storing unit 1002 in the FIB perceiving entry storing unit 1003 includes the FIB sequence number in the FIB entry and the index of the ARP entry. The ARP studying and storing unit 1004 is modified to study and store an ARP entry. After determining that the FIB sequence number in the found FIB perceiving entry is identical with the FIB sequence number in the session entry, the session entry searching unit 1008 needs to search for the ARP entry in the ARP studying and storing unit 1004 according to the index of ARP entry in the FIB perceiving entry and send the ARP entry to the forwarding unit 1011. The forwarding unit 1011 is modified to receive the packet processed through the security-related processing and sent from the security-related processing unit 1010, receive the ARP entry sent from the session entry searching unit 1008 and the session entry establishing and updating unit 1009 and forward the packet according to the ARP entry.

Embodiment Three

The packet forwarding process according to the present embodiment mainly includes:

searching for at least one security information entry, a FIB entry and an ARP entry for an initial packet of a stream according to the prior art, recording information of all security-related processing implemented on the initial packet, establishing a relationship among stream attribute information of the initial packet, information of all the security-related processing implemented on the packet and the ARP entry corresponding to the packet;

when a succeeding packet of the stream is received, implementing security-related processing and forwarding on the succeeding packet according to the security-related processing information and the ARP entry which are found based on the relationship.

Therefore, the information of the security-related processing and the ARP entry for the succeeding packet of the stream can be directly obtained based on the relationship, and the security-related processing and forwarding can be directly implemented on the succeeding packet without implementing the process of searching for security-related entry, FIB entry and ARP entry.

Hereinafter, the present embodiment will be further described in detail with reference to the drawings.

Figure 11:
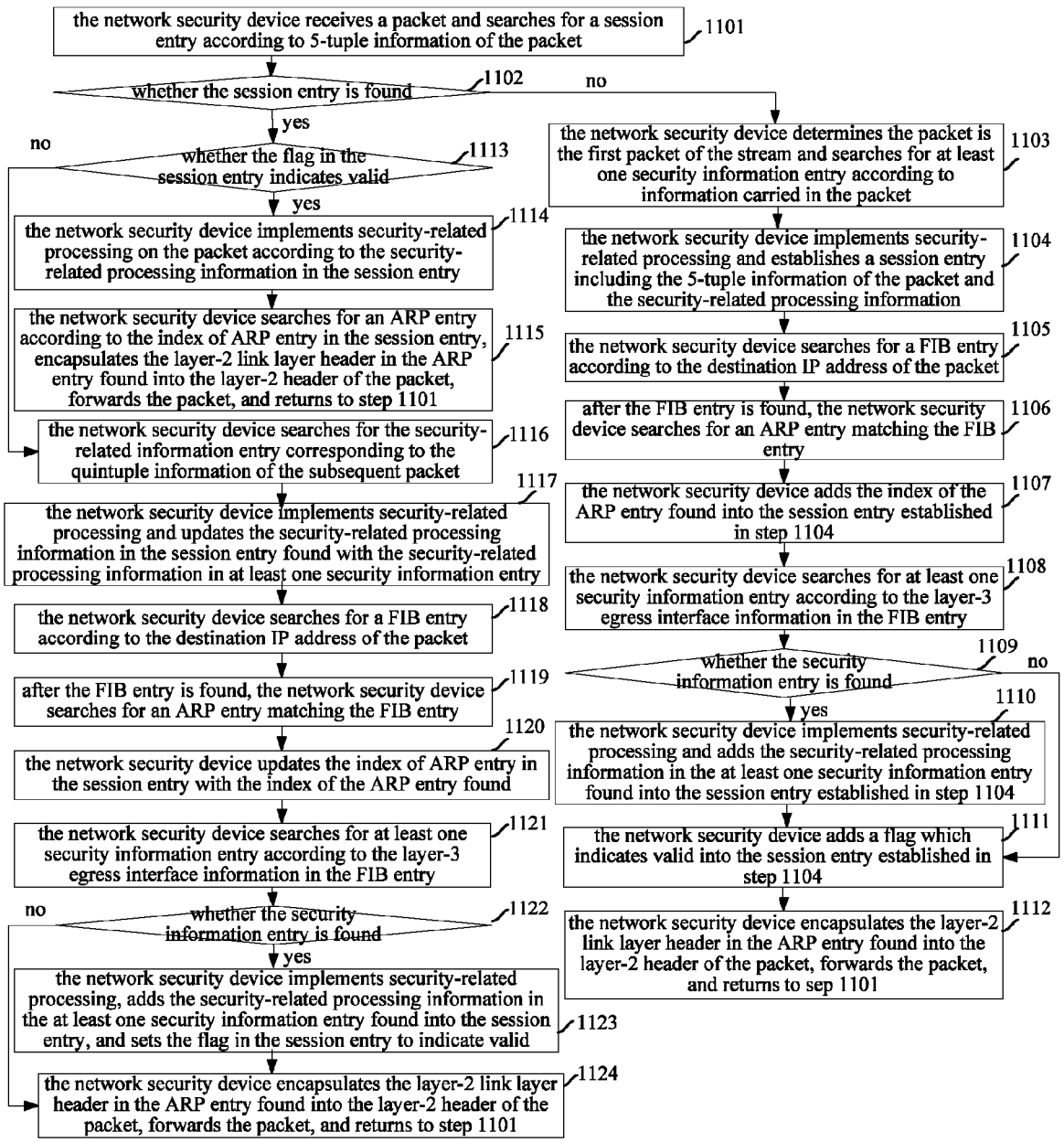
FIG. 11 is a flow chart illustrating a method for implementing security-related processing on packet in accordance with Embodiment three of the present invention.

FIG. 11 is a flow chart illustrating a method for implementing security-related processing on packet in accordance with Embodiment three of the present invention.

In step 1101, a network security device receives a packet, and searches for a session entry according to 5-tuple information of the packet.

In step 1102, the network security device determines whether the session entry is found. If the session entry is found, step 1113 is performed, otherwise, step 1103 is performed.

In step 1103, the network security device determines that the packet is the initial packet of the stream, and searches for at least one security information entry according to the 5-tuple information carried in the initial packet.

In step 1104, the network security device implements security-related processing according to the security-related processing information in the at least one security information entry found, records information of all security-related processing implemented, establishes a session entry which includes the 5-tuple information of the initial packet and the security-related processing information.

In step 1105, the network security device searches for a FIB entry according to the destination IP address of the initial packet.

In step 1106, after the FIB entry is found, the network security device searches for an ARP entry matching the FIB entry.

In this step, when the FIB entry is found, the network security device stores a relationship between the index of the FIB entry and the index of the session entry established. When the FIB entry is modified or deleted, all the session entries corresponding to the FIB entry can be found through the relationship, a flag indicating "invalid" may be established in all the session entries found. Therefore, when a succeeding packet of the stream is received, it can be judged whether the FIB entry has been modified or deleted by the flag in the session entry. If the FIB has been modified or deleted, a process for updating the session entry can be triggered.

In step 1107, the network security device adds the index of the ARP entry found into the session entry established in step 1104.

It can be seen that after this step, the session entry established by the network security device includes the 5-tuple information, the security-related processing information and the index of ARP entry.

In step 1108, the network security device searches for at least one security information entry according to the layer-3 egress interface information in the FIB entry.

The FIB entry includes destination IP address information, destination mask information, layer-3 egress interface information and next hop information.

In step 1109, the network security device determines whether the security information entry is found. If the security information entry is found, step 1110 is performed, otherwise step 1111 is performed.

In step 1110, the network security device implements security-related processing on the initial packet according to the security-related processing information in the at least one security information entry found, and adds the security-related processing information into the session entry established in step 1104. After the processing is implemented, step 1111 is performed.

In step 1111, the network security device adds a flag indicating "valid" into the session entry established in step 1104.

If the security information entry is not found in the step 1109, it means that no security-related processing needs to be implemented on the out-domain of the initial packet.

In step 1112, the network security device encapsulates the layer-2 link layer header in the ARP entry found into the layer-2 header of the initial packet, forwards the packet, and then performs step 1101 again.

In step 1113: the network security device determines that the packet is a succeeding packet of the stream, and determines whether the flag in the session entry indicates "valid". If the flag in the session entry indicates "valid", step 1114 is performed, otherwise step 1116 is performed.

In step 1114, the network security device determines that the FIB entry has not been modified or deleted and that the index of ARP entry in the session entry is correct, and implements security-related processing on the succeeding packet according to the security-related processing information in the session entry. After the processing is terminated, step 1115 is performed.

In step 1115, the network security device searches for an ARP entry according to the index of ARP entry in the session entry, encapsulates the layer-2 link layer header in the ARP entry into the layer-2 header of the succeeding packet, forwards the packet, and performs step 1101 again.

In step 1116: the network security device determines that the FIB entry has been modified or deleted, in which case, the succeeding packet should processed as an initial packet. The network security device searches for at least one security information entry according to the 5-tuple information of the succeeding packet.

In step 1117, the network security device implements security-related processing on the succeeding packet according to the security-related processing information in the at least one security information entry found, and updates the security-related processing information in the session entry with the security-related processing information in the at least one security information entry found.

In step 1118, the network security device searches for a FIB entry according to the destination IP address of the succeeding packet.

In step 1119, after the FIB entry is found, the network security device searches for an ARP entry matching the FIB entry.

In step 1120, the network security device updates the index of ARP entry in the session entry with the index of the ARP entry found.

In step 1121, the network security device searches for at least one security information entry according to the layer-3 egress interface information in the FIB entry.

In step 1122, the network security device determines whether the security information entry is found. If the security information entry is found; step 1123 is performed, otherwise step 1124 is performed.

In step 1123, the network security device implements security-related processing on the succeeding packet according to the security-related processing information in the at least one security information entry found, adds the security-related processing information into the session entry, and sets the flag in the session entry to indicate "valid". After the processing is completed, step 1124 is performed.

In step 1124, the network security device encapsulates the layer-2 link layer header in the ARP entry found into the layer-2 header of the succeeding packet, forwards the packet, and performs step 1101.

From the process shown in FIG. 11 it can be seen that, after the process of searching for security information entry, FIB entry and ARP entry for the initial packet of the stream is implemented, information of all security-related processing implemented is recorded and the established session entry includes the 5-tuple information, the security-related processing information, the index of ARP entry and the flag.

When a succeeding packet of the stream is received, the above session entry may be found out according to the 5-tuple information of the succeeding packet, and security-related processing can be implemented according to the security-related processing information in the session entry. The ARP entry can also be found according to the index of ARP entry in the session entry, according to which the succeeding packet is forwarded. It can be seen that information of all the security-related processing is stored together in the session entry, so the efficiency of the security-related processing is improved. Further, when searching for the ARP entry, the procedure of searching for a FIB entry according to the 5-tuple information and searching for a matching ARP entry will not have to be performed, and the ARP entry can be directly obtained according to the index of ARP entry in the session entry, thus the forwarding efficiency is also improved.

In the embodiment shown in FIG. 11, the process of searching for security-related processing information and packet forwarding information for a succeeding packet of the stream is implemented in the main control module. An embodiment in which the process of searching for security-related processing information and packet forwarding information for a succeeding packet is implemented in the packet processing module will be described as follows.

Figure 12:
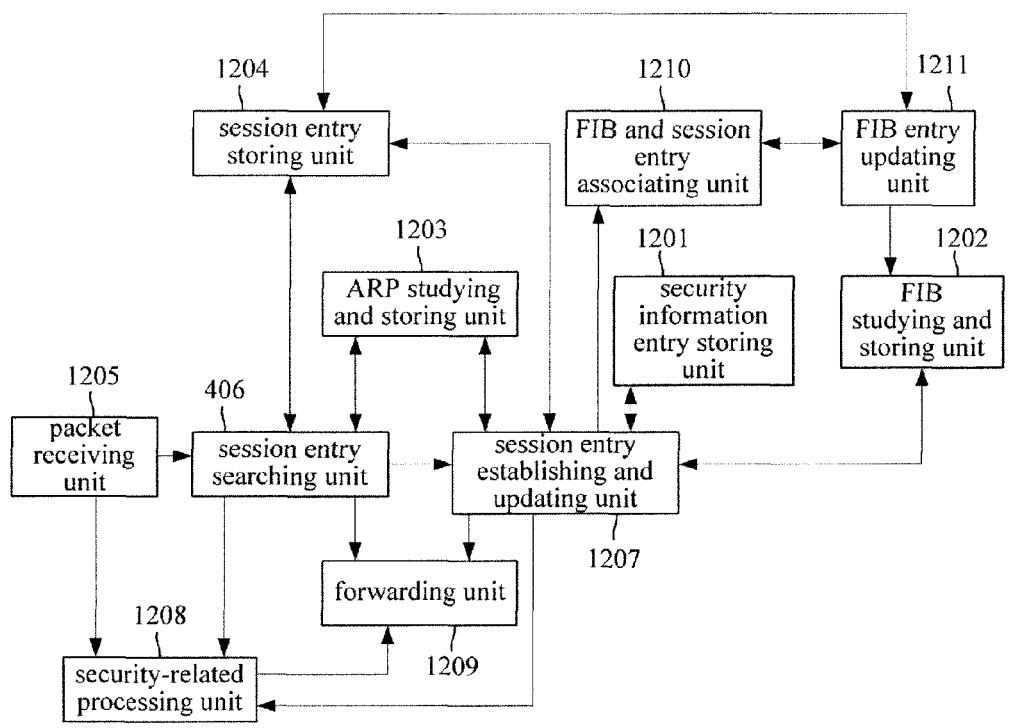
FIG. 12 is a schematic illustrating a structure of a network security device in accordance with Embodiment three of the present invention.

FIG. 12 is a schematic illustrating a structure of a network security device in accordance with Embodiment three of the present invention. As shown in FIG. 12, the device mainly includes: security information entry storing unit 1201, FIB studying and storing unit 1202, ARP studying and storing unit 1203, session entry storing unit 1204, packet receiving unit 1205, session entry searching unit 1206, session entry establishing and updating unit 1207, security-related processing unit 1208, forwarding unit 1209, FIB and session entry associating unit 1210 and FIB entry updating unit 1211.

The security information entry storing unit 1201 is adapted to store security information entries. Each security information entry includes 5-tuple information and/or forwarding information and security-related processing information.

The FIB studying and storing unit 1202 is adapted to study and store a FIB entry.

The ARP studying and storing unit 1203 is adapted to study and store an ARP entry.

The session entry storing unit 1204 is adapted to store session entries. Each session entry includes 5-tuple information, security-related processing information, an index of ARP perceiving entry and a flag.

The packet receiving unit 1205 is adapted to receive a packet, and send the packet to the security-related processing unit 1208 and session entry searching unit 1206.

The session entry searching unit 1206 is adapted to receive the packet from the packet receiving unit 1205, search the session entry storing unit 1204 for a session entry according to the 5-tuple information of the packet. If the session entry is found, the session entry searching unit 1206 is further adapted to determine whether the flag in the session entry indicates "valid", if the flag in the session entry indicates "valid", send the security-related processing information in the session entry to the security-related processing unit 1208, search the ARP studying and storing unit 1203 for an ARP entry according to the index of ARP entry in the session entry, and send the ARP entry to the forwarding unit 1209; if the flag in the session entry indicates "invalid", send an updating indication which carries the packet and the index of the session entry to the session entry establishing and updating unit 1207. If the session entry is not found, the session entry searching unit 1206 is further adapted to send an establishing indication which carries the packet to the session entry establishing and updating unit 1207.

The session entry establishing and updating unit 1207 is adapted to receive the establishing indication carrying the packet and sent from the session entry searching unit 1206, search the security information entry storing unit 1201 for at least one security information entry according to the information carried in the packet, such as the 5-tuple information, send the security-related processing information in the at least one security information entry found to the security-related processing unit 1208, and establish a new session entry. The session entry includes the 5-tuple information and the security-related processing information in the at least one security information entry found. The session entry establishing and updating unit 1207 is further adapted to search the FIB studying and storing unit 1202 for a FIB entry according to the destination IP address of the packet, store a relationship between the index of the FIB entry and the established session entry in the FIB and session entry associating unit 1210, search the ARP studying and storing unit 1203 for an ARP entry matching the FIB entry, send the ARP entry to the forwarding unit 1209, add the index of ARP perceiving entry in the ARP entry into the newly established session entry, and search the security information entry storing unit 1001 for at least one security information entry according to the layer-3 egress information in the FIB entry found, if the security information entry is found, send the security-related processing information in the at least one security information entry to the security-related processing unit 1208, add the security-related processing information in the at least one security information entry into the newly established session entry, and store the session entry in the session entry storing module 1204. The session entry establishing and updating unit 1207 is further adapted to receive the updating indication which carries the packet and the index of session entry and is sent from the session entry searching unit 1206, search the security information entry storing unit 1201 for at least one security information entry according to the information carried in the packet, such as the 5-tuple information, send the security-related processing information in the at least one security information entry found to the security-related processing unit 1208, search the session entry storing unit 1204 for the session entry according to the index of session entry, update the security-related processing information in the session entry with the security-related processing information according to the at least one security information entry found, search the FIB studying and storing unit 1202 for a FIB entry according to the destination IP address of the packet, search the ARP studying and storing unit 1203 for an ARP entry matching the FIB entry, send the ARP entry to the forwarding unit 1209, update the index of ARP perceiving entry in the session entry with the index of ARP perceiving entry in the ARP entry, and search the security information entry storing unit 1201 for at least one security information entry according to the layer-3 egress information in the FIB entry found, if the security information entry is found, send the security-related processing information in the at least one security information entry found to the security-related processing unit 1208 and add the security-related processing information in the at least one security information entry into the session entry.

The security-related processing unit 1208 is adapted to receive the packet from the packet receiving unit 1205, receive the security-related processing information from the session entry searching unit 1206 or the session entry establishing and updating unit 1207, implement security-related processing on the packet according to the security-related processing information, and then send the packet to the forwarding unit 1209.

The forwarding unit 1209 is adapted to receive the packet which has been through the security-related processing and is sent from the security-related processing unit 1208, receive the ARP entry sent from the session entry searching unit 1206 or the session entry establishing and updating unit 1207, and forward the packet according to the ARP entry.

The FIB and session entry associating unit 1210 is adapted to store the relation between the index of FIB entry and the index of session entry.

The FIB entry updating unit 1211 is adapted to update a FIB entry in the FIB studying and storing unit 1202, and when the FIB entry is updated, search the FIB and session entry associating unit 1210 for an index of session entry according to the index of the FIB entry updated, search the session entry storing module 1204 for a session entry according to the index of session entry, and set a flag indicating "invalid" in the session entry.

In practice, the security information entry storing unit 1201, the FIB studying and storing unit 1202, the ARP studying and storing unit 1203, the session entry storing unit 1204, the session entry searching unit 1206 and the session entry establishing and updating unit 1207 may be collectively called the service forwarding and associating module if classified by function.

In the embodiment shown in FIG. 12, the security information entry storing unit 1201, the FIB studying and storing unit 1202, the ARP studying and storing unit 1203 and the session entry storing unit 1204 can be implemented by the main control module.

Figure 13:
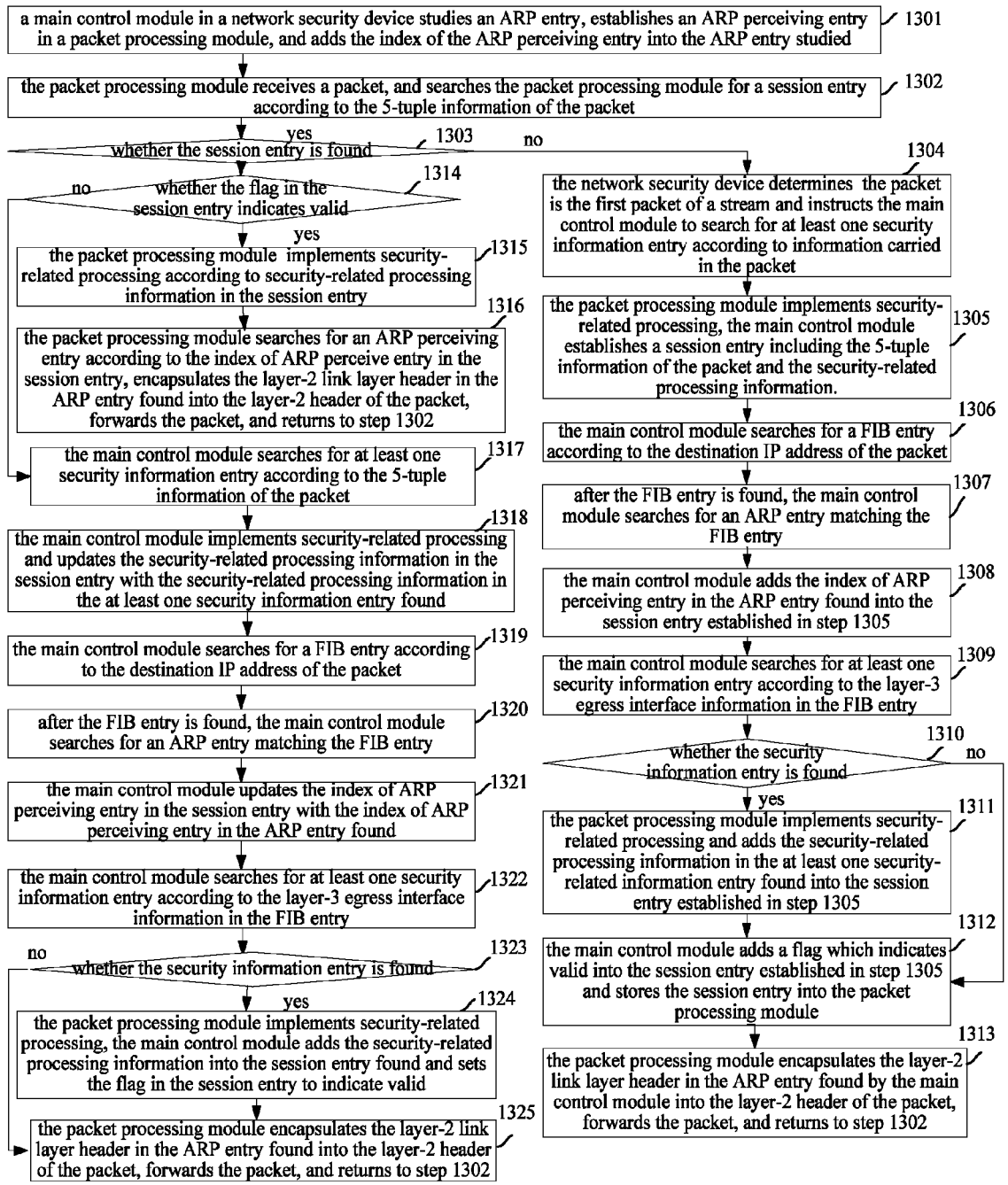
FIG. 13 is a flow chart illustrating a method for implementing security-related processing on packet in accordance with Embodiment three of the present invention.

FIG. 13 is a flow chart illustrating a method for implementing security-related processing on packet in accordance with Embodiment three of the present invention. As shown in FIG. 13, the method includes steps as follows.

In step 1301, the main control module in a network security device studies an ARP entry, and establishes an ARP perceiving entry in the packet processing module, and adds the index of the ARP perceiving entry into the ARP entry. The contents of the ARP perceiving entry are identical with the contents of the ARP entry When the ARP entry is updated, the main control module searches for the ARP perceiving entry in the packet processing module according to the index of ARP perceiving entry in the ARP entry, and update the ARP perceiving entry accordingly.

In step 1302, the packet processing module receives a packet, and searches the packet processing module for a session entry according to the 5-tuple information of the packet.

In step 1303, the network security device determines whether the session entry is found, if the session entry is found, step 1314 is performed, otherwise, step 1304 is performed.

In step 1304, the network security device determines that the packet is the initial packet of a stream and instructs the main control module to search for at least one security information entry according to information carried in the initial packet, such as the 5-tuple information.

In step 1305, the packet processing module implements security-related processing on the initial packet according to the security-related processing information in the at least one security information entry found by the main control module. The main control module establishes a session entry. The session entry includes the 5-tuple information of the initial packet and the security-related processing information.

In step 1306, the main control module searches for a FIB entry according to the destination IP address of the initial packet.

In step 1307, after the FIB entry is found, the main control module searches for an ARP entry matching the FIB entry.

In this step, when the FIB entry is found, the main control module may further store a relationship between the index of the FIB entry and the index of the session entry established, and when the FIB entry is modified or deleted, search for all session entries corresponding to the FIB entry according to the relationship, set a flag indicating "invalid" in all the session entries. Therefore, when a succeeding packet of the stream is received, whether the FIB entry has been modified or deleted can be determined according to the flag in the session entry. If the FIB has been modified or deleted, an updating process of the session entry can triggered.

In step 1308, the main control module adds the index of ARP perceiving entry in the ARP entry found into the session entry established in step 1305.

It can be seen that after the step, the session entry established by the main control module includes 5-tuple information, security-related processing information and index of ARP perceiving entry.

In step 1309, the main control module searches for at least one security information entry according to the layer-3 egress interface information in the FIB entry.

In step 1310, the main control module determines whether the security information entry is found, if the security information entry is found, step 1311 is performed, otherwise step 1312 is performed.

In step 1311, the packet processing module implements security-related processing on the initial packet according to the security-related processing information in the at least one security information entry found by the main control module, and adds the security-related processing information into the session entry established in step 1305. After the processing is completed, step 1312 is performed.

In step 1312, the main control module sets a flag indicating "valid", adds the flag into the session entry established in step 1305, and stores the session entry in the packet processing module.

In step 1313, the packet processing module encapsulates the layer-2 link layer header in the ARP entry found by the main control module into the layer-2 header of the initial packet, forwards the packet, and performs step 1302.

In step 1314, the packet processing module determines that the packet is a succeeding packet of the stream, and determines whether the value of the flag in the session entry indicates "valid". If the value of the flag in the session entry indicates "valid", step 1315 is performed, otherwise step 1317 is performed.

In step 1315, the packet processing module determines that the FIB entry has not been modified or deleted and that the index of ARP perceiving entry in the session entry is correct, implements security-related processing on the succeeding packet according to the security-related processing information in the session entry, and performs step 1316.

In step 1316, the packet processing module searches for an ARP perceiving entry according to the index of ARP perceiving entry in the session entry, encapsulates the layer-2 link layer header in the ARP entry found into the layer-2 header of the succeeding packet, forwards the packet, and performs step 1302.

In step 1317, the packet processing module determines that the FIB entry has been modified or deleted, and the succeeding packet is processed through the same procedure as the initial packet. The main control module searches for at least one security information entry according to 5-tuple information of the succeeding packet.

In step 1318, the main control module implements security-related processing on the succeeding packet according to security-related processing information in the at least one security information entry found, and updates the security-related processing information in the session entry with the security-related processing information in the at least one security information entry found.

In step 1319, the main control module searches for a FIB entry according to the destination IP address of the succeeding packet.

In step 1320, after the FIB entry is found, the main control module searches for an ARP entry matching the FIB entry.

In step 1321, the main control module updates the index of ARP perceiving entry in the session entry with the index of ARP perceiving entry in the ARP entry found.

In step 1322, the main control module searches for at least one security information entry according to the layer-3 egress interface information in the FIB entry.

In step 1323, the main control module determines whether the security information entry is found, if the security information entry is found; step 1324 is performed, otherwise step 1325 is performed.

In step 1324, the packet processing module implements security-related processing on the succeeding packet according to the security-related processing information in the at least one security information entry found. The main control module adds the security-related processing information into the session entry, and sets the value of the flag in the session entry to indicate "valid". After the procedure is completed, step 1325 is performed.

In step 1325, the packet processing module encapsulates the layer-2 link layer header in the ARP entry found into the layer-2 header of the succeeding packet, forwards the succeeding packet, and performs step 1302.

From the process shown in FIG. 13 it can be seen that, after the ARP entry is studied by the main control module, the ARP perceiving entry corresponding to the ARP entry may be stored in the packet processing module, and the index of the ARP perceiving entry is added into the ARP entry.

When the main control module performs searching of the security information entry, the FIB entry and the ARP entry for an initial packet of the stream, the session entry stored in the packet processing module according to the search result may include the 5-tuple information, the security-related processing information, the index of ARP perceiving entry and a flag.

When a succeeding packet of the stream is received by the packet processing module, the above session entry can be found in the packet processing module according to the 5-tuple information of the succeeding packet, the security-related processing is implemented according to the security-related processing information in the session entry, the ARP perceiving entry in the packet processing module can be found according to the index of ARP perceiving entry in the session entry, and then the succeeding packet is forwarded. It can be seen that both the security-related processing and the forwarding of the succeeding packet are implemented in the packet processing module without participation of the main control module, thus the efficiency of the security-related processing and forwarding of the succeeding packet can be greatly improved.

In the above embodiment, if the ARP entry studied by the main control module is modified, the index of ARP entry in the relationship needs updating, and the updating process is similar with the updating of the relationship when the FIB entry is updated and would not be described in detail herein.

Figure 14:
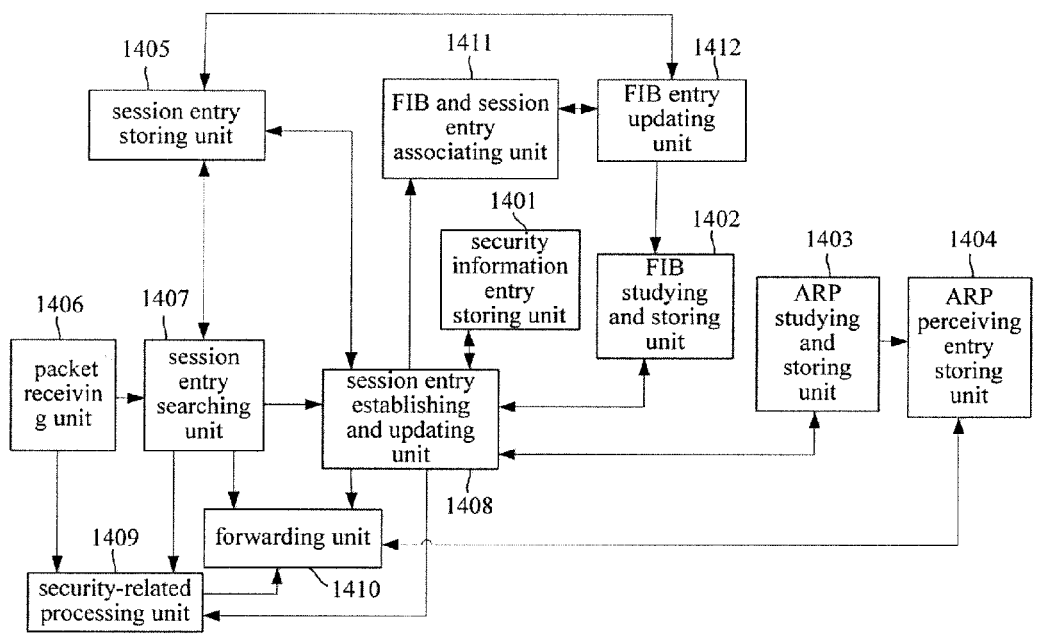
FIG. 14 is a schematic illustrating a structure of a network security device in accordance with Embodiment three of the present invention.

FIG. 14 is a schematic illustrating a structure of q network security device in accordance with Embodiment three of the present invention. As shown in FIG. 14, the device mainly includes: ] security information entry storing unit 1401, FIB studying and storing unit 1402, ARP studying and storing unit 1403, ARP perceiving entry storing unit 1404, session entry storing unit 1405, packet receiving unit 1406, session entry searching unit 1407, session entry establishing and updating unit 1408, security-related processing unit 1409, forwarding unit 1410, FIB and session entry associating unit 1411 and FIB entry updating unit 1412.

The security information entry storing unit 1401 is adapted to store security information entries. Each security information entry may include 5-tuple information and/or forwarding information and security-related processing information.

The FIB studying and storing unit 1402 is adapted to study and store a FIB entry.

The ARP studying and storing unit 1403 is adapted to study and store an ARP entry, and establish an ARP perceiving entry in the ARP perceiving entry storing unit 1404. The contents of the ARP perceiving entry are identical with the contents of the ARP entry. The ARP studying and storing unit 1403 is further adapted to add the index of the ARP perceiving entry into the ARP entry.

The ARP perceiving entry storing unit 1404 is adapted to store the ARP perceiving entry.

The session entry storing unit 1405 is adapted to store session entries. Each session entry includes 5-tuple information, security-related processing information, an index of ARP perceiving entry and a flag.

The packet receiving unit 1406 is adapted to receive a packet and send the packet to the security-related processing unit 1409 and session entry searching unit 1407.

The session entry searching unit 1407 is adapted to receive the packet from the packet receiving unit 1406, search the session entry storing unit 1405 for a session entry according to information carried in the packet, such as the 5-tuple information. If the session entry is found, the session entry searching unit 1407 is further adapted to determine whether the flag in the session entry indicates "valid", if the flag in the session entry indicates "valid", send the security-related processing information in the session entry to the security-related processing unit 1409, and send the index of ARP perceiving entry in the session entry to the forwarding unit 1410; if the flag in the session entry indicates "invalid", send an updating indication including the packet and the index of the session entry to the session entry establishing and updating unit 1408. If the session entry is not found, the session entry searching unit 1407 is further adapted to send an establishing indication including the packet to the session entry establishing and updating unit 1408.

The session entry establishing and updating unit 1408 is adapted to receive the establishing indication carrying the packet from the session entry searching unit 1407, search the security information entry storing unit 1401 for at least one security information entry according to information carried in the packet, such as the 5-tuple information, send the security-related processing information in the at least one security information entry found to the security-related processing unit 1409, and establish a new session entry. The new session entry includes the 5-tuple information and the security-related processing information in the at least one security information entry. The session entry establishing and updating unit 1408 is further adapted to search the FIB studying and storing unit 1402 for a FIB entry according to the destination IP address of the packet, store a relationship between the indexes of the FIB entry and the session entry in the FIB and session entry associating unit 1411, search the ARP studying and storing unit 1403 for an ARP entry matching the FIB entry, send the ARP entry to the forwarding unit 1410, add the index of ARP perceiving entry in the ARP entry into the newly established session entry, and search the security information entry storing unit 1401 for at least one security information entry according to the layer-3 egress information in the FIB entry, if the security information entry is found, send the security-related processing information in the at least one security information entry to the security-related processing unit 1409, add the security-related processing information in the at least one security information entry into the newly established session entry, and store the session entry in the session entry storing module 1405. The session entry establishing and updating unit 1407 is further adapted to receive the updating indication carrying the packet and the index of session entry from the session entry searching unit 1206, search the security information entry storing unit 1401 for at least one security information entry according to information carried in the packet, such as the 5-tuple information, send the security-related processing information in the at least one security information entry found to the security-related processing unit 1409, search the session entry storing unit 1405 for a session entry according to the index of session entry, update the security-related processing information in the session entry with the security-related processing information in the at least one security information entry found, search the FIB studying and storing unit 1402 for a FIB entry according to the destination IP address of the packet, search the ARP studying and storing unit 1403 for an ARP entry matching the FIB entry, send the ARP entry to the forwarding unit 1410, update the index of ARP perceiving entry in the session entry with the index of ARP perceiving entry in the ARP entry found, and search the security information entry storing unit 1401 for at least one security information entry according to the layer-3 egress information in the FIB entry found. If the security information entry is found, the session entry establishing and updating unit 1407 is further adapted to send the security-related processing information in the at least one security information entry found to the security-related processing unit 1409 and add the security-related processing information into the session entry.

The security-related processing unit 1409 is adapted to receive the packet sent by the packet receiving unit 1406, receive the security-related processing information from the session entry searching unit 1407 or the session entry establishing and updating unit 1408, implement security-related processing on the packet according to the security-related processing information, and send the packet to the forwarding unit 1410.

The forwarding unit 1410 is adapted to receive the packet, on which the security-related processing has been implemented, from the security-related processing unit 1409, receive the index of ARP perceiving entry from the session searching unit 1407, search the ARP perceiving entry storing unit 1404 for an ARP perceiving entry according to the index of ARP perceiving entry, and forward the packet according to the ARP perceiving entry; or receive the ARP from the session entry establishing and updating unit 1408, and forward the packet according to the ARP entry.

The FIB and session entry associating unit 1411 is adapted to store the relationship between the index of FIB entry and the index of session entry.

The FIB entry updating unit 1412 is adapted to update a FIB entry in the FIB studying and storing unit 1402, and when the FIB entry is updated, search the FIB and session entry associating unit 1411 for at least one index of session entry according to the index of the FIB entry updated, search the session entry storing module 1405 for a session entry according to each of the at least one index of session entry, and set the flag in the session entry to indicate "invalid".

In practice, the security information entry storing unit 1401, the FIB studying and storing unit 1402, the ARP studying and storing unit 1403, the ARP perceiving entry storing unit 1404, the session entry storing unit 1405, the session entry searching unit 1407 and the session entry establishing and updating unit 1408 can be collectively called service forwarding and associating module if classified by function.

In the embodiment shown in FIG. 14, the security information entry storing unit 1401, the FIB studying and storing unit 1402 and the ARP studying and storing unit 1403 are units according to the prior art and are usually implemented by software. While the ARP perceiving entry storing unit 1404, the session entry storing unit 1405 are units provided by the embodiment of the present invention and can be implemented in the packet processing module. Preferably, the packet processing module is implemented by logic devices, such as TCAM and FPGA, so as to accelerate the accessing of the session entry, the FIB perceiving entry and the ARP perceiving entry in the network security device and improve the packet forwarding efficiency based on security.

In the above embodiments, an aging mechanism of session entry can be adopted, so that session entries which have not been accessed for a period of time are deleted from the network security device to save resources of the device.

In addition, there are two situations in which the security-related processing information in a session entry may need to be updated.

In one situation, when the security-related configuration information in the network security device is updated, the security-related processing information in the session entry needs to he updated, and can be updated through various means. For example, an abstract of the security-related configuration information in the network security device can be calculated and stored in the session entry when the session entry is established. When the security-related configuration information is updated, the abstract of the security-related configuration information is updated synchronously. When a succeeding packet is received and a session entry is found out and before the security-related processing is implemented, it is first determined that whether the abstract of the security-related configuration information stored in the network security device is identical with the abstract in the session entry. If the abstract stored in the network security device is identical with the abstract in the session entry; it means that the configuration of the security information entries has not been updated. If the abstract stored in the network security device is different from the abstract in the session entry, it means that the configuration of the security information entries has been updated before the succeeding packet is received, and a process for updating the security information entry can be triggered, i.e., the succeeding packet is processed in the same way as the initial packet, which has been described in the above embodiments and will not be described in detail anymore. The abstract of the security-related configuration information can be calculated by using a certain algorithm, such as a hashing algorithm. The hashing algorithm can generate an output with fixed length based on input information of arbitrary length. Other algorithms may also be used. Since the security information entries are generally configured for in-domain and out-domain of the network security device respectively, abstracts of the security-related configuration information can be calculated respectively for the in-domain and the out-domain. If the security information entries are configured respectively for different types of security-related processing, the abstracts can also be calculated respectively for the different types of security information entries. Both calculating the abstract of all the security information entries and calculating the abstracts for different types of security information entries have their respective disadvantages and advantages. When the abstracts are calculated respectively for different types of security information entries, information about which entries have been updated may be obtained, and particular security-related processing information in a session entry which is related to the updated security information entries can be selected to be updated, however, more abstract comparing is required. When the abstract of all the security information entries is calculated, after a succeeding packet is received, the abstract comparing will only be implemented once.

Secondly, when a FIB entry is updated, since the layer-3 egress information may be modified, security-related processing information for the out-domain in the session entry may also need modification accordingly. For example, when the determining results in the steps 718, 918, 1113 and 1314 are negative, not only the FIB entry and the ARP entry need to be updated, but also the security-related processing information in the session entry needs to be updated.

To sum up, the method for implementing security-related processing on packet provided by embodiments of the present invention accelerates the security-related processing on succeeding packets of a stream and improves the packet processing efficiency by establishing a relationship between the stream attribute information and the security-related processing information, and the process of searching for security information entries will not be implemented for succeeding packets.

The device for implementing security-related processing on the packet provided by the embodiments of the present invention accelerates the security-related processing on succeeding packets of a stream and improves the packet processing efficiency by storing a relationship between the stream attribute information and the security-related processing information, and the process of searching for security information entries will not be implemented for the succeeding packets.

Another device for implementing security-related processing on packet provided by the embodiments of the present invention further accelerates the security-related processing on succeeding packets of a stream and further improves the packet processing efficiency by storing a relationship between the stream attribute information and the security-related processing information in hardware, and the security-related processing of a succeeding packet can be directly implemented in hardware without searching for security information entries in software.

The foregoing description is only preferred embodiments and is not for use in limiting the protection scope thereof. All the modifications, equivalent replacements and improvements in the scope of the present invention's principles shall be included in the protection scope.

The invention claimed is:

1. A method for implementing security-related processing on packet, comprising:
receiving an initial packet of a stream, implementing security-related processing on the initial packet according to security-related configuration information, recording information of the security-related processing implemented on the initial packet, establishing a relationship between stream attribute information of the initial packet and the security-related processing information recorded which comprises a security-related processing operation;
receiving a succeeding packet of the stream, acquiring the security-related processing operation according to the relationship and stream attribute information of the succeeding packet, and implementing the security-related processing operation on the succeeding packet, wherein implementing security-related processing on the initial packet according to security-related configuration information comprises (i) searching a forwarding information base (FIB) table for a FIB entry which matches the stream attribute information of the initial packet, (ii) searching the security-related configuration information for at least one security information entry matching the FIB entry, and (iii) implementing security-related processing on the initial packet according to the at least one security information entry;
associating the FIB entry with the relationship; and
when the FIB entry is updated, setting a flag indicating invalid in the relationship associated to the FIB entry,
wherein acquiring the security-related processing information and implementing security-related processing on the succeeding packet comprise (i) judging whether the flag in the relationship indicates invalid, (ii) if the flag indicates invalid, implementing security-related processing on the succeeding packet according to the security-related configuration information, recording information of the security-related processing implemented, updating the security-related processing information in the relationship with the security-related processing information recorded, and setting the flag in the relationship to indicate valid, and (iii) if the flag indicates valid, acquiring the security-related processing information according to the relationship and stream attribute information of the succeeding packet, and implementing security-related processing on the succeeding packet based on the security-related processing information.

2. The method of claim 1, further comprising:
acquiring packet forwarding information according to the stream attribute information of the initial packet, forwarding the initial packet according to the packet forwarding information and storing the packet forwarding information in the relationship;
when receiving the succeeding packet of the stream, acquiring the packet forwarding information according to the relationship and the stream attribute information of the succeeding packet, and forwarding the succeeding packet according to the packet forwarding information.

3. The method of claim 2, wherein acquiring the packet forwarding information according to the stream attribute information of the initial packet comprises searching a FIB table for a FIB entry which matches the stream attribute information of the initial packet, searching an address resolution protocol (ARP) table for an ARP entry which matches the FIB entry, and acquiring the packet forwarding information from the ARP entry;

storing the packet forwarding information in the relationship comprises:

storing the index of the FIB entry in the relationship; and forwarding the succeeding packet according to the packet forwarding information comprises acquiring the FIB entry according to the index of FIB entry in the relationship, searching for an ARP entry matching the FIB entry, and forwarding the succeeding packet according to the packet forwarding information in the ARP entry.

4. The method of claim 3, further comprising:

setting a FIB sequence number for the FIB entry, when the FIB entry is updated, changing the FIB sequence number of the FIB entry; and storing the FIB sequence number of the FIB entry into the relationship when storing the index of the FIB entry in the relationship;

wherein acquiring the packet forwarding information and forwarding the succeeding packet comprise determining the FIB entry according to the index of FIB entry stored in the relationship, acquiring the FIB sequence number in the FIB entry, comparing the FIB sequence number acquired with the FIB sequence number stored in the relationship; if the two FIB sequence numbers are not identical, searching the FIB table for a FIB entry matching the stream attribute information of the succeeding packet, updating the index of the FIB entry stored in the relationship with the index of the FIB entry found, updating the FIB sequence number stored in the relationship with the FIB sequence number in the FIB entry found, acquiring packet forwarding information in an ARP entry matching the FIB entry found, and forwarding the succeeding packet based on the packet forwarding information; if the two FIB sequence numbers are identical, acquiring the FIB entry according to the index of FIB entry in the relationship, searching for an ARP entry matching the FIB entry, and forwarding the succeeding packet according to the packet forwarding information in the ARP entry.

5. The method of claim 3, further comprising:

associating the FIB entry with the relationship;

when the FIB entry is updated, setting a flag indicating invalid in the relationship associated with the FIB entry;

wherein acquiring the packet forwarding information and forwarding the succeeding packet comprise judging whether the flag in the relationship indicates invalid, if the flag indicates invalid, searching the FIB table for a FIB entry matching the stream attribute information of the succeeding packet, updating the index of FIB entry stored in the relationship with the index of the FIB entry found, and setting the flag in the relationship to indicate valid, acquiring packet forwarding information from an ARP entry matching the FIB entry found, and forwarding the succeeding packet based on the packet forwarding information; if the flag indicates valid, acquiring the FIB entry according to the index of FIB entry in the relationship, searching for an ARP entry matching the FIB entry, and forwarding the succeeding packet according to the packet forwarding information in the ARP entry.

6. The method of claim 4, before searching for a FIB entry which matches the stream attribute information of the succeeding packet, further comprising:

implementing security-related processing on the succeeding packet according to the security-related configuration information if the two FIB sequence numbers are not identical, recording information of the security-related processing implemented, updating the security-related processing information in the relationship with the security-related processing information recorded.

7. The method of claim 1, further comprising:

establishing a second relationship between a forwarding information base (FIB) entry and an ARP entry which matches the FIB entry; acquiring a FIB entry matching the stream attribute information of a packet received, acquiring an address resolution protocol (APR) entry according to the second relationship and the FIB entry, and forwarding the packet according to packet forwarding information in the ARP entry.

8. The method of claim 7, wherein establishing the second relationship between the FIB entry and the ARP entry matching the FIB entry comprises storing an index of the ARP entry in the FIB entry;

the method further comprises when the FIB entry is updated, searching an ARP table for an ARP entry matching the FIB entry updated, updating the index of ARP entry stored in the FIB entry with the index of the ARP entry found.

9. The method of claim 2, wherein acquiring packet forwarding information according to the stream attribute information of the initial packet comprises searching a FIB table for a FIB entry matching the stream attribute information of the initial packet, searching an address resolution protocol (ARP) table for an ARP entry matching the FIB entry, and acquiring packet forwarding information from the ARP entry;

storing the packet forwarding information in the relationship comprises:

storing the index of the ARP entry in the relationship; and forwarding the succeeding packet according to the packet forwarding information comprises acquiring an ARP entry according to the index of ARP entry stored in the relationship, acquiring the packet forwarding information from the ARP entry.

10. The method of claim 9, further comprising:

associating the FIB entry with the relationship;

when updating the FIB entry, setting a flag indicating invalid in the relationship associated to the FIB entry; and wherein acquiring the packet forwarding information and forwarding the succeeding packet comprise judging whether the flag in the relationship indicates invalid, if the flag indicates invalid, searching the FIB table for a FIB entry matching the stream attribute information of the succeeding packet, searching the ARP table for an ARP entry matching the FIB entry acquired, updating the index of the ARP entry in the relationship with the index of the ARP entry found, setting the flag in the relationship to indicate valid, acquiring the packet forwarding information in the ARP entry found, and forwarding the succeeding packet; if the flag indicates valid, acquiring the FIB entry according to the index of FIB entry in the relationship, searching for an ARP entry matching the FIB entry, and forwarding the succeeding packet according to the packet forwarding information in the ARP entry.

11. The method of claim 1, further comprising:
when receiving the initial packet of the stream, storing the abstract of the security-related configuration information in the relationship; and
when receiving the succeeding packet of the stream, comparing the abstract of the security-related configuration information with the abstract stored in the relationship, if the abstracts are not identical, updating the abstract stored in the relationship with the abstract of the security-related configuration information;
implementing security-related processing on the succeeding packet according to the security-related configuration information, recording information of the security-related processing implemented, and updating the security-related processing information in the relationship with the security-related processing information recorded.

12. The method of claim 1, further comprising:
searching a session table for a session entry according to stream attribute information of a packet received, if the session entry is found, determining the packet is the succeeding packet of the stream, if the session entry is not found, determining the packet is the initial packet of the stream;
wherein establishing the relationship between the stream attribute information of the initial packet and the security-related processing information recorded comprises adding a session entry in the session table; wherein the session entry comprises the stream attribute information and the security-related processing information recorded; and
wherein implementing security-related processing on the succeeding packet according to the security-related processing information in the relationship comprises searching the session table for a session entry according to the stream attribute information of the succeeding packet, implementing security-related processing on the succeeding packet according to the security-related processing information stored in the session entry.

13. The method of claim 1, wherein the security-related configuration information comprises a relationship between at least a portion of the stream attribute information and a security-related processing operation;
the security-related processing information comprises information of a security-related processing operation; and
the stream attribute information comprises 5-tuple information of a packet.

14. A network security device, comprising a main control module and a packet processing module, wherein
the packet processing module is configured to receive an initial packet of a stream, and provide stream attribute information of the initial packet for the main control module;
the main control module is configured to store security-related configuration information, receive the stream attribute information from the packet processing module, search the security-related configuration information for security-related processing information matching the stream attribute information, provide the security-related processing information found which comprises a security-related processing operation for the packet processing module, and store a relationship between the stream attribute information and the security-related processing information found into the packet processing module;
the packet processing module is further configured to implement security-related processing on the initial packet according to the security-related processing information provided by the main control module, after receiving a succeeding packet of the stream, acquire the relationship according to the stream attribute information of the succeeding packet, implement the security-related processing on the succeeding packet according to the relationship
the main control module is further configured to store packet forwarding information configured, acquire packet forwarding information according to the stream attribute information, provide the packet forwarding information for the packet processing module, and store the packet forwarding information in the relationship;
the packet processing module is further configured to forward the initial packet according to the packet forwarding information provided by the main control information, when receiving the succeeding packet of the stream, acquire the packet forwarding information according to the relationship and the stream attribute information of the succeeding packet, and forward the succeeding packet according to the packet forwarding information;
the main control module is configured to store an address resolution protocol, ARP, perceiving entry in the packet processing module, wherein the ARP perceiving entry comprises contents of an ARP entry, and store an index of the ARP perceiving entry into the ARP entry, store a forwarding information base, FIB, perceiving entry in the packet processing module, wherein the FIB perceiving entry comprises contents of a FIB entry, and store the index of the FIB perceiving entry into the FIB entry, search an ARP table for an ARP entry matching the FIB entry, store the index of ARP perceiving entry in the ARP entry into the FIB perceiving entry, search a FIB table for a FIB entry matching the stream attribute information of the initial packet, acquire an ARP entry matching the FIB entry, acquire the packet forwarding information from the ARP entry and provide the packet forwarding information for the packet processing module, and store the index of FIB perceiving entry in the FIB entry into the relationship;
the packet processing module is configured to forward the initial packet according to the packet forwarding information provided by the main control module, when receiving the succeeding packet of the stream, acquire the index of FIB perceiving entry from the relationship based on the stream attribute information of the succeeding packet, acquire the FIB perceiving entry according to the index of FIB perceiving entry, acquire the ARP perceiving entry according to the index of ARP perceiving entry in the FIB perceiving entry, acquire the packet forwarding information from the ARP perceiving entry and forward the succeeding packet;
the main control module is further configured to (i) set a FIB sequence number for a FIB perceiving entry, when a FIB entry is updated, determine a FIB perceiving entry according to the index of FIB perceiving entry in the FIB entry, update contents of the FIB perceiving entry with contents of the FIB entry, change the FIB sequence number in the FIB perceiving entry, search the ARP table for an ARP entry matching the FIB entry updated, update the index of ARP perceiving entry in the FIB perceiving entry with an index of ARP perceiving entry in the ARP entry;

and (ii) store a FIB sequence number in the FIB perceiving entry corresponding to the initial packet into the relationship, when receiving the stream attribute information of the succeeding packet from the packet processing module, search security-related configuration information for security-related processing information matching the stream attribute information, and provide the security-related processing information found for the packet processing module, and update the security-related processing information in the relationship, search the FIB table for a FIB entry matching the stream attribute information of the succeeding packet, provide an index of FIB perceiving entry in the FIB entry for the packet processing module, and update the index of FIB perceiving entry in the relationship with the index of FIB perceiving entry in the FIB entry found; and the packet processing module is further configured to compare the FIB sequence number in the FIB perceiving entry with FIB sequence number stored in the relationship when acquiring the FIB perceiving entry; if the two FIB sequence numbers are not identical, provide the stream attribute information of the succeeding packet for the main control module, implement security-related processing on the succeeding packet according to security-related processing information provided by the main control module, acquire the FIB perceiving entry according to the index of FIB perceiving entry provided by the main control module, update the FIB sequence number in the relationship with the FIB sequence number in the FIB perceiving entry, determine an ARP perceiving entry according to the index of ARP perceiving entry in the FIB perceiving entry, acquire packet forwarding information from the ARP perceiving entry and forward the succeeding packet.

15. The device of claim 14, wherein the packet processing module is further configured to provide the stream attribute information of the succeeding packet for the main control module, forward the succeeding packet according to packet forwarding information provided by the main control module; and the main control module is further configured to acquire a forwarding information base, FIB, entry according to the stream attribute information of the initial packet, establish a second relationship between the FIB entry and an address resolution protocol, ARP, entry matching the FIB entry, acquire packet forwarding information from the ARP entry and provide the packet forwarding information for the packet processing module; when receiving the stream attribute information of the succeeding packet from the packet processing module, acquire the FIB entry according to the stream attribute information, acquire the ARP entry according to the second relationship and the FIB entry, acquire the packet forwarding information in the ARP entry and provide the packet forwarding information for the packet processing module.

16. The device of claim 15, wherein the main control module is configured to store the index of the ARP entry into the FIB entry, when the FIB entry is updated, search the ARP table for an ARP entry matching the FIB entry updated, update the index of ARP entry stored in the FIB entry with the index of the ARP entry found.

17. The device of claim 14, wherein the main control main is further configured to store an address resolution protocol (ARP) perceiving entry in the packet processing module, wherein contents of the ARP perceiving entry are identical with contents of an ARP entry, and add the index of the ARP perceiving entry into the ARP entry; store a forwarding information base (FIB) perceiving entry in the packet processing module, wherein the contents of the FIB perceiving entry are identical with contents of the FIB entry, and add the index of the FIB perceiving entry into the FIB entry; search an ARP table for an ARP entry matching the FIB entry, store the index of ARP perceiving entry in the ARP entry into the FIB perceiving entry; and the packet processing module is further configured to search for a FIB perceiving entry matching the stream attribute information of the succeeding packet, acquire packet forwarding information in an ARP perceiving entry corresponding to the index of ARP perceiving entry in the FIB perceiving entry, and forward the succeeding packet.

18. The device of claim 17, wherein the main control module is further configured to update contents of a FIB perceiving entry when a FIB entry is updated according to an index of FIB perceiving entry in a FIB entry by utilizing contents of the FIB entry when the FIB entry is updated, search the ARP table for an ARP entry matching the FIB entry updated, update the index of ARP perceiving entry in the FIB perceiving entry according to the index of ARP perceiving entry in the ARP entry found.

19. The device of claim 14, wherein the main control module is further configured to store an abstract of the security-related configuration information into the packet processing module, when the security-related configuration information is updated, update the abstract of the security-related configuration information in the packet processing module; when receiving the stream attribute information of the initial packet from the packet processing module, store the abstract of the security-related configuration information into the relationship corresponding to the stream attribute information; when receiving stream attribute information of a succeeding packet provided by the packet processing module, search the security-related configuration information for security-related processing information matching the stream attribute information, provide the security-related processing information for the packet processing module and update the security-related processing information in the relationship; and the packet processing module is further configured to compare, when receiving the succeeding packet, the abstract stored in the packet processing module with the abstract stored in the relationship, if the two abstracts are not identical, provide the stream attribute information of the succeeding packet for the main control module, implement security-related processing on the succeeding packet according to the security-related configuration information provided by the main control module and update the abstract stored in the relationship with the abstract stored in the packet processing module.

20. The device of claim 14, wherein the main control module is further configured to associate the relationship with a forwarding information base (FIB) entry matching the stream attribute information of the initial packet, when the FIB entry is updated, set a flag indicating invalid in the relationship associated with the FIB entry; when receiving stream attribute information of a succeeding packet from the packet processing module, search for security-related processing information matching the stream attribute information, update the security-relied processing information in the relationship and provide the security-related processing information for the packet processing module; and the packet processing module is further configured to judge whether the flag in the relationship indicates invalid, if the flag indicates invalid, provide the stream attribute information of the succeeding packet for the main control module, implement security-related processing on the succeeding packet according to the security-related processing information provided by the main control module, and set the flag in the relationship to indicate valid.

21. The device of claim 14, wherein the main control module is configured to add a session entry in a session table when receiving the stream attribute information of the initial packet from the packet processing module;
  wherein the session entry comprises the stream attribute information and the security-related processing information recorded; and
  wherein the packet processing module is configured to search, when receiving the succeeding packet of the stream, the session table for a session entry corresponding to the stream attribute information of the succeeding packet, implement security-related processing on the succeeding packet according to the security-related processing information stored in the session entry.

22. The device of claim 14, wherein the packet processing module is configured to search, when receiving a packet, for a relationship corresponding to the stream attribute information of the packet; if the relationship is found, determine the packet is a succeeding packet of a stream, otherwise, determine the packet is an initial packet of a stream.

23. A network security device, comprising a main control module and a packet processing module, wherein
  the packet processing module is configured to receive an initial packet of a stream, and provide stream attribute information of the initial packet for the main control module;
  the main control module is configured to store security-related configuration information, receive the stream attribute information from the packet processing module, search the security-related configuration information for security-related processing information matching the stream attribute information, provide the security-related processing information found which comprises a security-related processing operation for the packet processing module, and store a relationship between the stream attribute information and the security-related processing information found into the packet processing module;
  the packet processing module is further configured to implement security-related processing on the initial packet according to the security-related processing information provided by the main control module, after receiving a succeeding packet of the stream, acquire the relationship according to the stream attribute information of the succeeding packet, implement the security-related processing on the succeeding packet according to the relationship;
  wherein the main control module is further configured to store packet forwarding information configured, acquire packet forwarding information according to the stream attribute information, provide the packet forwarding information for the packet processing module, and store the packet forwarding information in the relationship;
  the packet processing module is further configured to forward the initial packet according to the packet forwarding information provided by the main control information, when receiving the succeeding packet of the stream, acquire the packet forwarding information according to the relationship and the stream attribute information of the succeeding packet, and forward the succeeding packet according to the packet forwarding information;
  wherein the main control module is configured to store an address resolution protocol, ARP, perceiving entry in the packet processing module, wherein the ARP perceiving entry comprises contents of an ARP entry, and store an index of the ARP perceiving entry into the ARP entry; store a forwarding information base, FIB, perceiving entry in the packet processing module, wherein the FIB perceiving entry comprises contents of a FIB entry, and store the index of the FIB perceiving entry into the FIB entry; search an ARP table for an ARP entry matching the FIB entry, store the index of ARP perceiving entry in the ARP entry into the FIB perceiving entry; search a FIB table for a FIB entry matching the stream attribute information of the initial packet, acquire an ARP entry matching the FIB entry, acquire the packet forwarding information from the ARP entry and provide the packet forwarding information for the packet processing module, and store the index of FIB perceiving entry in the FIB entry into the relationship;
  the packet processing module is configured to forward the initial packet according to the packet forwarding information provided by the main control module, when receiving the succeeding packet of the stream, acquire the index of FIB perceiving entry from the relationship based on the stream attribute information of the succeeding packet, acquire the FIB perceiving entry according to the index of FIB perceiving entry, acquire the ARP perceiving entry according to the index of ARP perceiving entry in the FIB perceiving entry, acquire the packet forwarding information from the ARP perceiving entry and forward the succeeding packet;
  wherein the main control module is further configured to associate the FIB entry with the relationship; when the FIB entry is updated, update contents of a FIB perceiving entry corresponding to the index of FIB perceiving entry in the FIB entry with contents of the FIB entry updated; search the ARP table for an ARP entry matching the FIB entry updated, update the index of ARP perceiving entry in the FIB perceiving entry with the index of ARP perceiving entry in the ARP perceiving entry, set a flag indicating invalid in the relationship associated with the FIB entry;
  when receiving stream attribute information of a succeeding packet provided by the packet processing module, search the security-related configuration information for security-related processing information matching the stream attribute information, and provide the security-related processing information for the packet processing module, update the security-related processing information in the relationship, search the FIB table for a FIB entry matching the stream attribute information, associate the FIB entry with the relationship, provide the index of FIB perceiving entry in the FIB entry for the packet processing module, update the index of FIB perceiving entry in the relationship with the index of the FIB perceiving entry in the FIB entry; and
  the packet processing module is further configured to judge whether the flag in the relationship indicates invalid, if the flag indicates invalid, provide the stream attribute information of the succeeding packet for the main control module, implement security-related processing on the succeeding packet according to the security-related processing information provided by the main control module, acquire the FIB perceiving entry according to the index of FIB perceiving entry provided by the main control module, acquire the ARP perceiving entry according to the index of ARP perceiving entry in the FIB perceiving entry, acquire packet forwarding information from the ARP perceiving entry and forward the succeeding packet according to the packet forwarding information, set the flag in the relationship to indicate valid.

24. A network security device, comprising a main control module and a packet processing module, wherein the packet processing module is configured to receive an initial packet of a stream, and provide stream attribute information of the initial packet for the main control module;

the main control module is configured to store security-related configuration information, receive the stream attribute information from the packet processing module, search the security-related configuration information for security-related processing information matching the stream attribute information, provide the security-related processing information found which comprises a security-related processing operation for the packet processing module, and store a relationship between the stream attribute information and the security-related processing information found into the packet processing module;

the packet processing module is further configured to implement security-related processing on the initial packet according to the security-related processing information provided by the main control module, after receiving a succeeding packet of the stream, acquire the relationship according to the stream attribute information of the succeeding packet, implement the security-related processing on the succeeding packet according to the relationship;

wherein the main control module is further configured to store packet forwarding information configured, acquire packet forwarding information according to the stream attribute information, provide the packet forwarding information for the packet processing module, and store the packet forwarding information in the relationship;

the packet processing module is further configured to forward the initial packet according to the packet forwarding information provided by the main control information, when receiving the succeeding packet of the stream, acquire the packet forwarding information according to the relationship and the stream attribute information of the succeeding packet, and forward the succeeding packet according to the packet forwarding information;

wherein the main control module is configured to store an address resolution protocol (ARP) perceiving entry in the packet processing module, wherein contents of the ARP perceiving entry are identical with contents of an ARP entry, and store the index of the ARP perceiving entry into the ARP entry; search a forwarding information base (FIB) table for a FIB entry matching the stream attribute information of the initial packet, search an ARP table for an ARP entry matching the FIB entry, and store the index of ARP perceiving entry in the ARP entry into the relationship corresponding to the stream attribute information in the packet processing module, acquire the packet forwarding information from the ARP entry and provide the packet forwarding information for the packet processing module; and wherein the packet processing module is further configured to acquire, when receiving a subsequent packet of the stream, the index of ARP perceiving entry from the relationship corresponding to the stream attribute information of the subsequent packet, acquire packet forwarding information from an ARP perceiving entry based on the index of ARP perceiving entry;

wherein the main control module is further configured to associate the FIB entry and the relationship; when the FIB entry is updated, set a flag in the relationship associated with the FIB entry to indicate invalid; when receiving the stream attribute information of the succeeding packet from the packet processing module, search the FIB table for a FIB entry matching the stream attribute information, search for an ARP entry matching the FIB entry, update the index of ARP perceiving entry in the relationship corresponding to the stream attribute information in the packet processing module with the index of ARP perceiving entry in the ARP entry, acquire packet forwarding information in the ARP entry and provide the packet forwarding information for the packet processing module;

wherein the packet processing module is further configured to judge whether the flag in the relationship indicates invalid, if the flag indicates invalid, provide the stream attribute information of the succeeding packet for the main control module, forward the succeeding packet according to the packet forwarding information provided by the main control module.

* * * * *